United States Patent [19]
Maeda

[11] Patent Number: 5,521,717
[45] Date of Patent: May 28, 1996

[54] IMAGE PROCESSING APPARATUS AND METHOD THEREFOR

[75] Inventor: Mitsuru Maeda, Yokohama, Japan

[73] Assignee: Canon Kabushiki Kaisha, Tokyo, Japan

[21] Appl. No.: 11,549

[22] Filed: Feb. 1, 1993

[30] Foreign Application Priority Data

Feb. 3, 1992 [JP] Japan .................................. 4-017475
Apr. 28, 1992 [JP] Japan .................................. 4-110068

[51] Int. Cl.⁶ .................................................. H04N 1/415
[52] U.S. Cl. ..................... 358/426; 358/261.2; 348/408; 382/240
[58] Field of Search ................. 358/426, 261.2, 358/261.3, 426, 427, 262.1, 433; 382/56, 233, 240, 299; 348/398, 408, 437, 438; 395/160; H04N 1/415

[56] References Cited

U.S. PATENT DOCUMENTS

| | | | |
|---|---|---|---|
| 4,939,583 | 7/1990 | Tsubori et al. | 358/261.1 |
| 4,951,157 | 8/1990 | Koh et al. | 358/433 |
| 4,969,204 | 11/1990 | Melnychuck et al. | 358/426 |
| 5,020,120 | 5/1991 | Weldy | 382/56 |
| 5,048,111 | 9/1991 | Jones et al. | 382/56 |
| 5,050,230 | 9/1991 | Jones et al. | 382/56 |
| 5,060,285 | 10/1991 | Dixit et al. | 382/56 |
| 5,086,487 | 2/1992 | Katayama et al. | 382/56 |
| 5,124,811 | 6/1992 | Ohsawa et al. | 358/448 |
| 5,136,396 | 8/1992 | Kato et al. | 358/426 |
| 5,138,672 | 8/1992 | Hirabayashi et al. | 382/54 |
| 5,153,749 | 10/1992 | Katayama | 358/448 |
| 5,159,468 | 10/1992 | Yoshida et al. | 358/451 |
| 5,185,813 | 2/1993 | Tsujimoto | 382/240 |
| 5,327,254 | 7/1994 | Daher | 358/261.1 |

FOREIGN PATENT DOCUMENTS 392753 10/1990 European Pat. Off. ....... H04N 1/387

OTHER PUBLICATIONS

Hampel et al., "Technical Features of the JBIG Standard for Progressive Bi–Level Image Compression", Signal Processing: Image Communication 4, No. 2 (Apr. 1992), pp. 103–111.

*Primary Examiner*—Kim Yen Vu
*Attorney, Agent, or Firm*—Fitzpatrick, Cella, Harper & Scinto

[57] ABSTRACT

Received sequentially encoded image data is converted into hierarchically encoded data having a resolution different from the sequentially encoded image data, and the converted encoded data is decoded with reference to an image of another layer. Received image data is divided into a plurality of grounds of data, and the divided grounds of data are stored. The same processing is performed on the divided data to obtain hierarchically encoded data, and obtained decoded image data is displayed.

30 Claims, 37 Drawing Sheets

ZEROTH LAYER / FIRST LAYER / SECOND LAYER

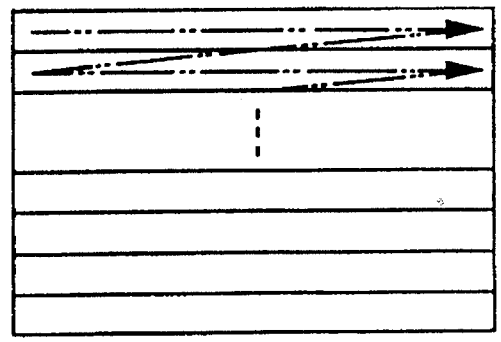
LINE BUFFER 21a    LINE BUFFER 21b
: EFFECTIVE DATA    : EMPTY AREA
: IN DATA WRITE ACCESS
F I G. 18C
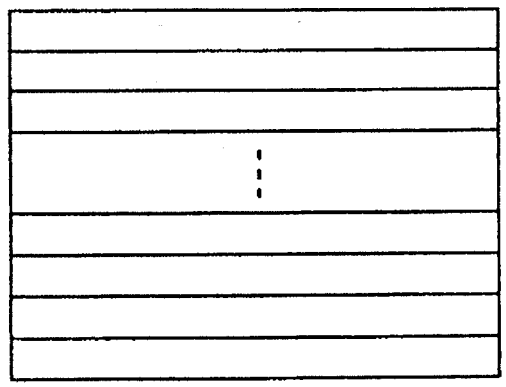 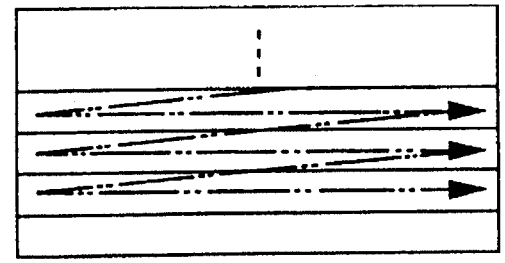
LINE BUFFER 21a    LINE BUFFER 21b
: EFFECTIVE DATA    : EMPTY AREA
: IN DATA WRITE ACCESS
F I G. 18D

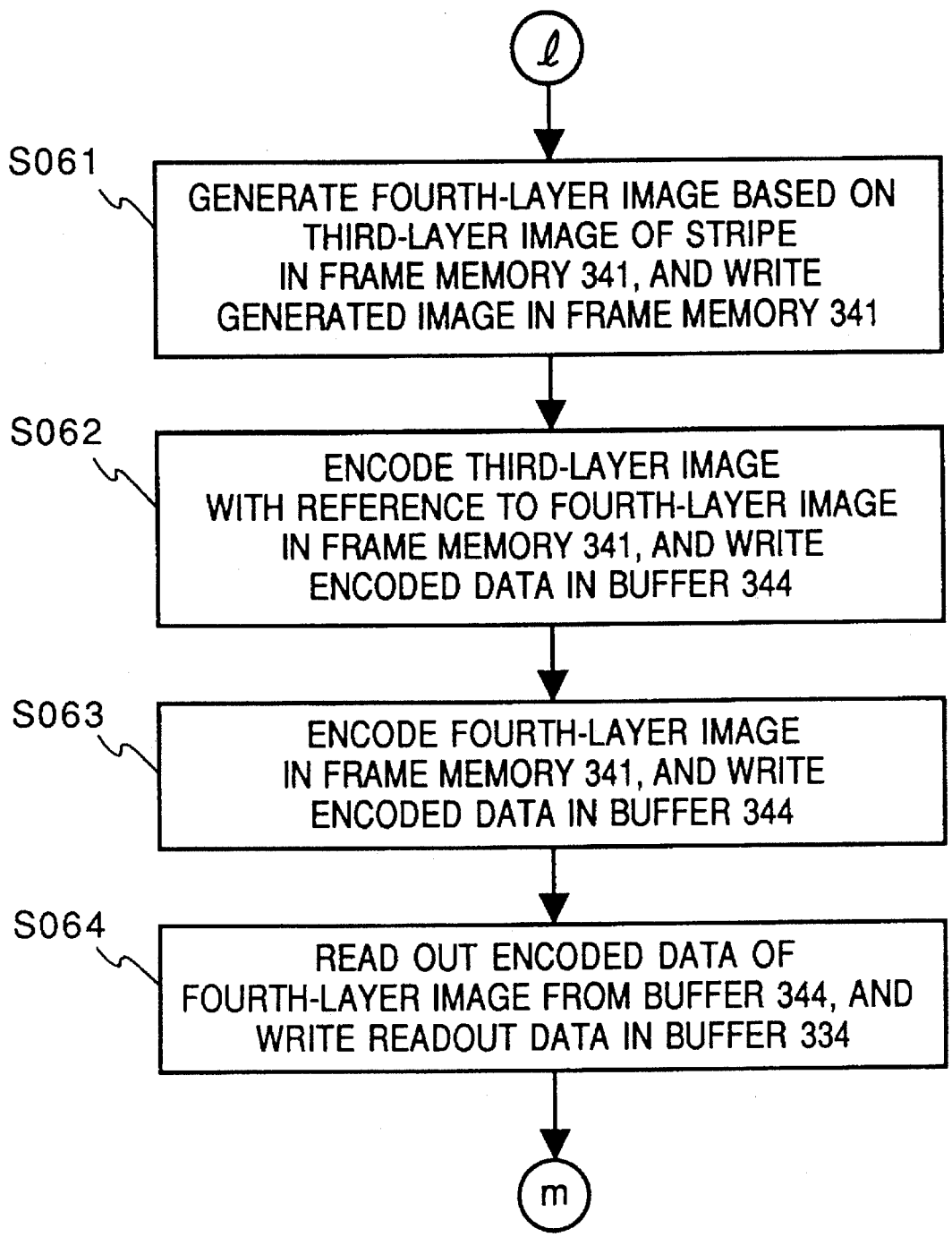

IMAGE PROCESSING APPARATUS AND METHOD THEREFOR

BACKGROUND OF THE INVENTION

The present invention relates to an image processing apparatus for processing hierarchically encoded image data, and a method therefor.

First, the concept of hierarchical encoding associated with the present invention will be described below. The hierarchical encoding has as its object to grasp the outline of an entire image at an early stage, and will be described with reference to a schematic diagram of FIG. 1. A process for reducing an image 601 (a bold rectangle in FIG. 1) input at the encoder side to ½ in the vertical and horizontal directions is repeated n times, thereby generating n reduced images in which an image having a minimum size is reduced to $2^{-n}$ the size of the original image in the vertical and horizontal directions. The reduction processing adopts a method of suppressing degradation of information, so that information of an entire image can be grasped even for a low-resolution image. For example, a JBIG (Joint Bi-level Image Coding Experts Group) algorithm adopts a so-called PRES method disclosed in U.S. Pat. No. 5,159,468 as reduction processing. In this case, an original image is called a zeroth-layer image (601), and images sequentially obtained in the reduction processing are respectively called a first-layer image (602) and a second-layer image (603).

In hierarchical encoding, encoded data of a layer image having a small size is decoded and displayed. The display operation is performed in the order from a layer image having the lowest resolution. In the display operation, an image multiplied with a proper enlargement magnification is displayed, so that the resolution is gradually increased as information is transmitted. For example, the second-layer image is displayed in a ×4 enlarged scale in the vertical and horizontal directions, and subsequently, the first-layer image is displayed in a ×2 enlarged scale in the vertical and horizontal directions. Such a display method is called a progressive display method. In the JBIG algorithm, encoding is achieved by arithmetic codes.

In the JBIG algorithm, stripes obtained by dividing an image in the sub-scanning direction are defined as units of encoding, thus realizing sequential transmission. FIG. 2 is a view showing this concept assuming that the number of layers is 2. In FIG. 2, bold lines represent images. A zeroth-layer image is divided into stripes $S_{0,0}$, $S_{1,0}$, $S_{2,0}$, $S_{3,0}$, $S_{4,0}$, $S_{5,0}$, $S_{6,0}$, and $S_{7,0}$. Similarly, a first-layer image is divided into stripes $S_{0,1}$ to $S_{7,1}$, and a second-layer image is divided into stripes $S_{0,2}$ to $S_{7,2}$.

In the JBIG algorithm, two transmission modes are available in association with stripes, as shown in FIGS. 3 and 4.

In FIG. 3, header information obtained by encoding the size of an original image, the number of layers, the number of scanning lines per stripe, a data format, and the like is followed by encoded data ($C_{0,2}$ to $C_{7,2}$) obtained by sequentially encoding the stripes ($S_{0,2}$ to $S_{7,2}$) of the second-layer image. Thereafter, encoded data ($C_{0,1}$ to $C_{7,1}$) obtained by sequentially encoding the stripes ($S_{0,1}$ to $S_{7,1}$) of the first-layer image with reference to the second-layer image, and encoded data ($C_{0,0}$ to $C_{7,0}$) obtained by sequentially encoding the stripes ($S_{0,0}$ to $S_{7,0}$) of the zeroth-layer image with reference to the first-layer image follow. The format of these encoded data will be referred to as a "plane data format" hereinafter.

In FIG. 4, header information obtained by encoding the size of an original image, the number of layers, the number of scanning lines per stripe, a data format, and the like is followed by encoded data $C_{0,2}$ of the stripe $S_{0,2}$ of the second-layer image of the stripe $S_{0,0}$, encoded data $C_{0,1}$ of the stripe $S_{0,1}$ of the first-layer image, which data is encoded with reference to the stripe $S_{0,2}$ of the second-layer image of the stripe $S_{0,0}$, and encoded data $C_{0,0}$ of the stripe $S_{0,0}$ of the zeroth-layer image, which data is encoded with reference to the first-layer image of the stripe $S_{0,0}$. Then, encoded data ($C_{1,2}$ to $C_{1,0}$) of the stripe $S_{1,0}$, ..., and encoded data ($C_{7,2}$ to $C_{7,0}$) of the stripe $S_{7,0}$ follow in the order of stripes. The format of these encoded data will be referred to as a "stripe data format" hereinafter.

In general, as the number of layers is increased with respect to an original image, the total code length is increased. For example, in the JBIG algorithm, since information as an image is satisfactorily preserved even at a low resolution by the reduction algorithm, the total code length is increased. More specifically, the total code length obtained when the number of layers is 4 with respect to an original image is longer than that obtained when the number of layers is 3.

Similarly, as the number of stripes is increased, the code length is increased. For example, the JBIG algorithm adopts dynamic arithmetic codes, and encoding is performed more properly as the size of an object to be encoded is larger. Therefore, when an image is divided into stripes, encoding is initialized at the beginning of each stripe, and a merit of dynamic encoding is difficult to obtain. For this reason, encoding efficiency is not improved, and the code length is increased. More specifically, the code length obtained when the number of stripes is 4 with respect to an image is longer than that obtained when the number of stripes is 2.

However, in the above-mentioned processing, even when the progressive display mode or the sequential transmission mode is not required, for example, even when data are copied or moved between databases, or when data are sent, communications are performed while the number of layers or stripes remains large, resulting in high communication cost.

In addition, upon sending of data, a transmitting device may wastefully transmit unnecessary layers to a receiving device.

Conventionally, a terminal for receiving sequentially encoded data obtained by encoding pixel values themselves or data obtained by converting the pixel values by MMR coding or MH coding used in a communication terminal such as a facsimile apparatus, or by DPCM or vector quantization has an arrangement, as shown in, e.g., FIG. 5.

In FIG. 5, reference numeral 101 denotes a communication line such as a telephone line, an ISDN, a computer network, or the like; 102, a communication interface for extracting data supplied through the communication line 101; 103, a storage device comprising, e.g., a semiconductor, a magnetic storage device, or the like; 104, a decoder for decoding sequentially encoded data to generate image data; 105, a video frame memory; 106, a display comprising a liquid crystal display, a CRT display, or the like; and 107, a recording device for recording image data on, e.g., a paper sheet.

In the conventional terminal, encoded data received through the communication line 101 and the communication interface 102 is directly stored in the storage device 103, or is immediately decoded by the decoder 104, and is then recorded on, e.g., a paper sheet by the recording device 107.

Also, encoded data is temporarily stored in the storage device 103, and image data stored in the storage device is written in the video frame memory 105, as needed, thereby displaying image data on the display 106. Then, image data, which must be recorded on, e.g., a paper sheet, is selected based on the displayed data, and the selected image data is output from the recording device 107.

However, in the conventional communication terminal, since the resolution of the display 106 is too low as compared to the reading-recording density of image data, when sequentially encoded data is displayed while being decoded, the entire image cannot be displayed on the display 106, and a scroll display operation is required. As a result, it requires much time for a user to grasp the entire image.

In order to obtain desired image data from the image data stored in the storage device 103, a user must display and search reproduced images one by one on the display 106 at a high resolution, resulting in troublesome operations and a heavy temporal load.

Furthermore, sequentially encoded data cannot be directly subjected to hierarchical display or encoding.

SUMMARY OF THE INVENTION

It is an object of the present invention to provide an image processing apparatus, which realizes an easy display of images by matching the resolution of decoded image data with that of a display.

It is another object of the present invention to provide an image processing apparatus, which can save the memory capacity for storing image data obtained by decoding, and can improve communication efficiency of image data.

In order to achieve the above objects, according to the present invention, there is provided an image processing apparatus comprising: converting means for converting sequentially encoded image data into hierarchically encoded data having a predetermined number of layers; storing means for storing the hierarchically encoded data in units of layers; decoding means for decoding the hierarchically encoded data with reference to image data of a layer different from a layer of the hierarchically encoded data to be decoded; and display means for visually displaying image data decoded by the decoding means.

According to the present invention, there is also provided an image processing apparatus comprising: input means for inputting image data encoded by using a sequential encoding method; converting means for converting the input image data into hierarchically encoded image data having a predetermined number of layers; and storing means for storing the hierarchically encoded image data.

According to the present invention, there is also provided an image processing apparatus comprising: storing means for storing n-layer (n is an integer) hierarchically encoded image data; converting means for converting the n-layer hierarchically encoded image data into m-layer (m is an integer) hierarchically encoded image data; and output means for outputting the m-layer hierarchically encoded image data.

According to the present invention, there is also provided an image processing apparatus having converting means for converting r-layer (r is an integer) encoded image data into first encoded data having s layers (s is an integer, and s≧r) comprising: extracting means for extracting second encoded data associated with image data of a layer having the lowest resolution from the r-layer encoded image data; decoding means for decoding the second encoded data; generating means for generating third encoded data having (s−r) layers from an image obtained by said decoding means; and synthesizing means for synthesizing the third encoded data and data obtained by deleting the encoded data of the layer having the lowest resolution from the r-layer encoded image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 18A to 18E are schematic views showing data write operations in a line buffer;

FIGS. 20A to 20C and FIGS. 21A to 21G are flow charts showing an image communication procedure in a receiving terminal in the apparatus according to the third embodiment;

DESCRIPTION OF THE PREFERRED EMBODIMENTS

The preferred embodiments of the present invention will be described in detail below with reference to the accompanying drawings.

[First Embodiment]

Figure 1:
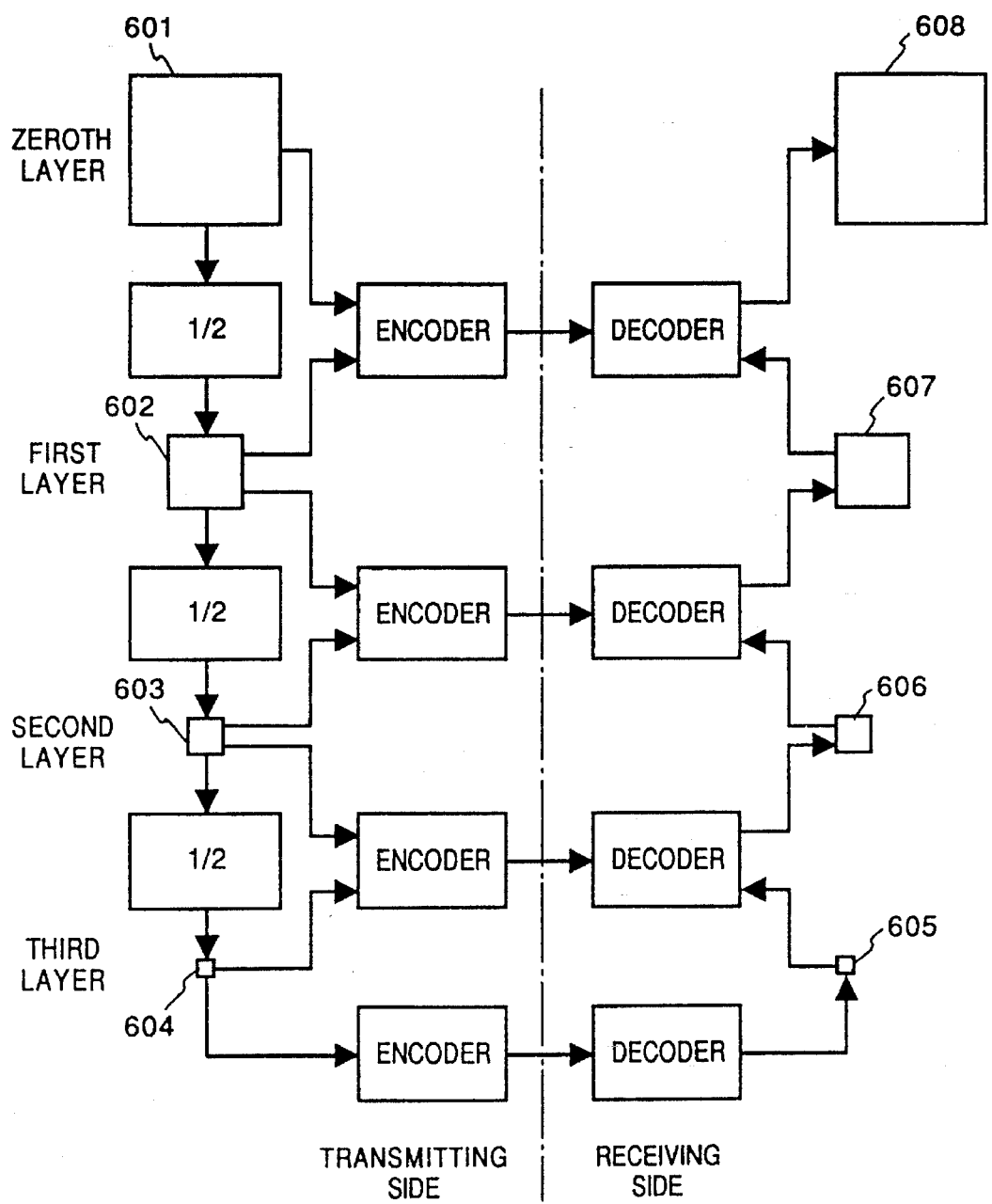
FIG. 1 is a diagram for explaining the concept of hierarchical encoding.
Figure 2:
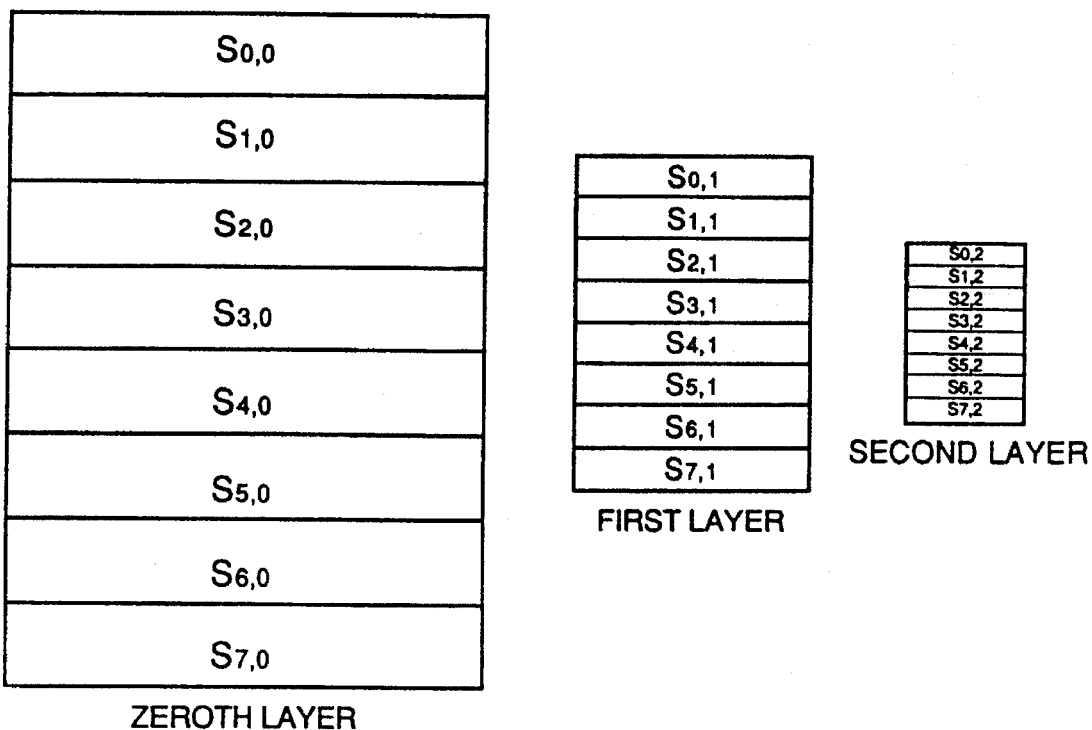
FIG. 2 is a view showing stripes in the JBIG algorithm.
Figure 3:
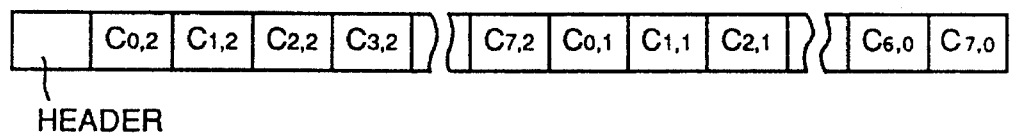
FIG. 3 is a view showing a plane data format as encoded data.
Figure 4:
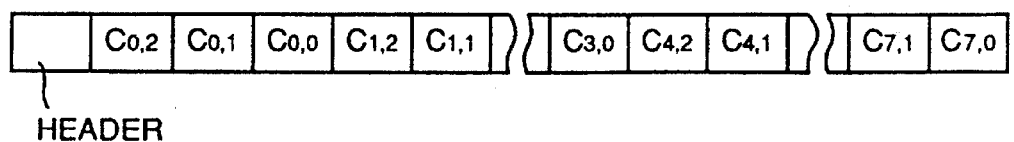
FIG. 4 is a view showing a stripe data format as encoded data.
Figure 5:
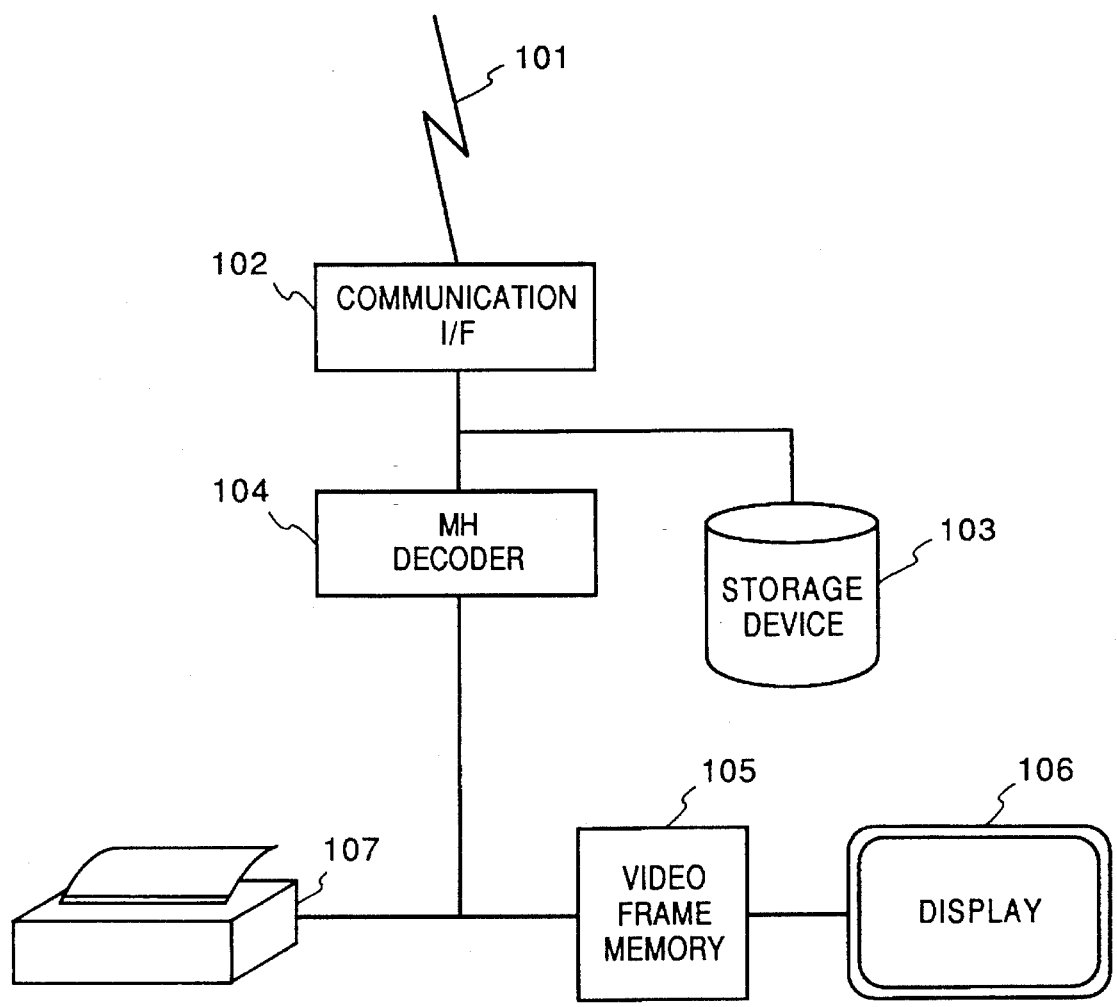
FIG. 5 is a block diagram showing an arrangement of a conventional communication terminal.
Figure 6:
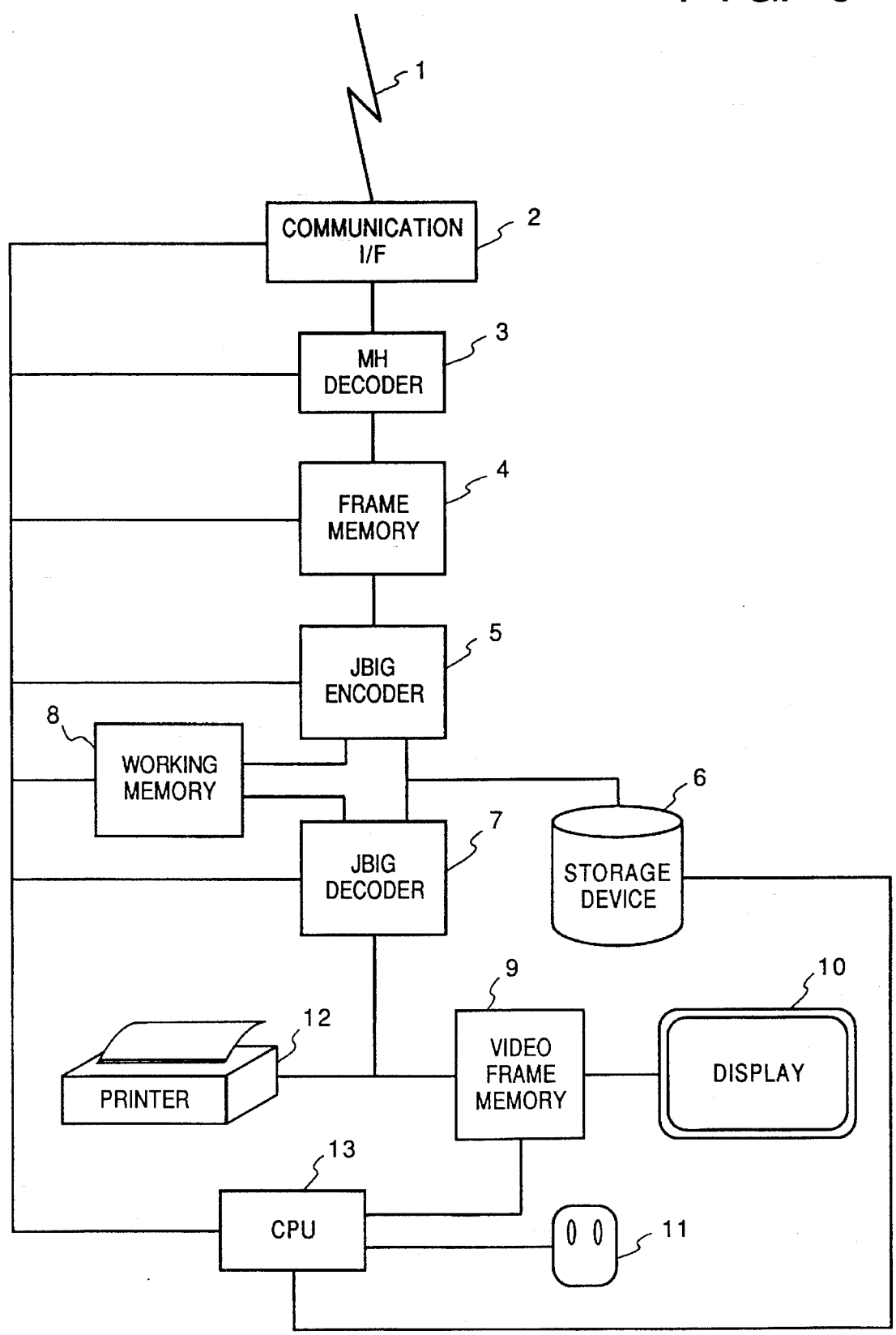
FIG. 6 is a block diagram showing an arrangement of an image communication receiving terminal apparatus according to the first embodiment of the present invention.

FIG. 6 is a block diagram showing an arrangement of an image communication receiving terminal apparatus (to be referred to as a terminal apparatus hereinafter) according to the first embodiment of the present invention. For the sake of descriptive simplicity of the embodiment, a binary black-and-white image is assumed to be an object to be processed. It is also assumed that sequential encoding adopts MH encoding, and a hierarchical encoding method adopts a JBIG method. Furthermore, the hierarchical encoding is performed up to a third-layer image (⅛ reduced scale).

In FIG. 6, reference numeral 1 denotes a communication line; and 2, a communication interface for extracting MH-encoded image data from information input through the communication line 1. Reference numeral 3 denotes an MH decoder for decoding input MH-encoded data to generate decoded image data. Reference numeral 4 denotes a frame memory for storing decoded image data for one frame.

Reference numeral 5 denotes a JBIG encoder; and 6, a storage device for storing hierarchically encoded data. Reference numeral 7 denotes a JBIG decoder for decoding hierarchically encoded data; and 8, a working memory for storing layer images (first- to third-layer images, as described above) generated upon encoding/decoding of a layer image. Reference numeral 9 denotes a video frame memory; and 10, a display for display the content of the video frame memory 9. Reference numeral 11 denotes a mouse for designating a position on the display; 12, a high-resolution printer; and 13, a CPU for controlling the operation of the image communication terminal of this embodiment.

Figure 7:
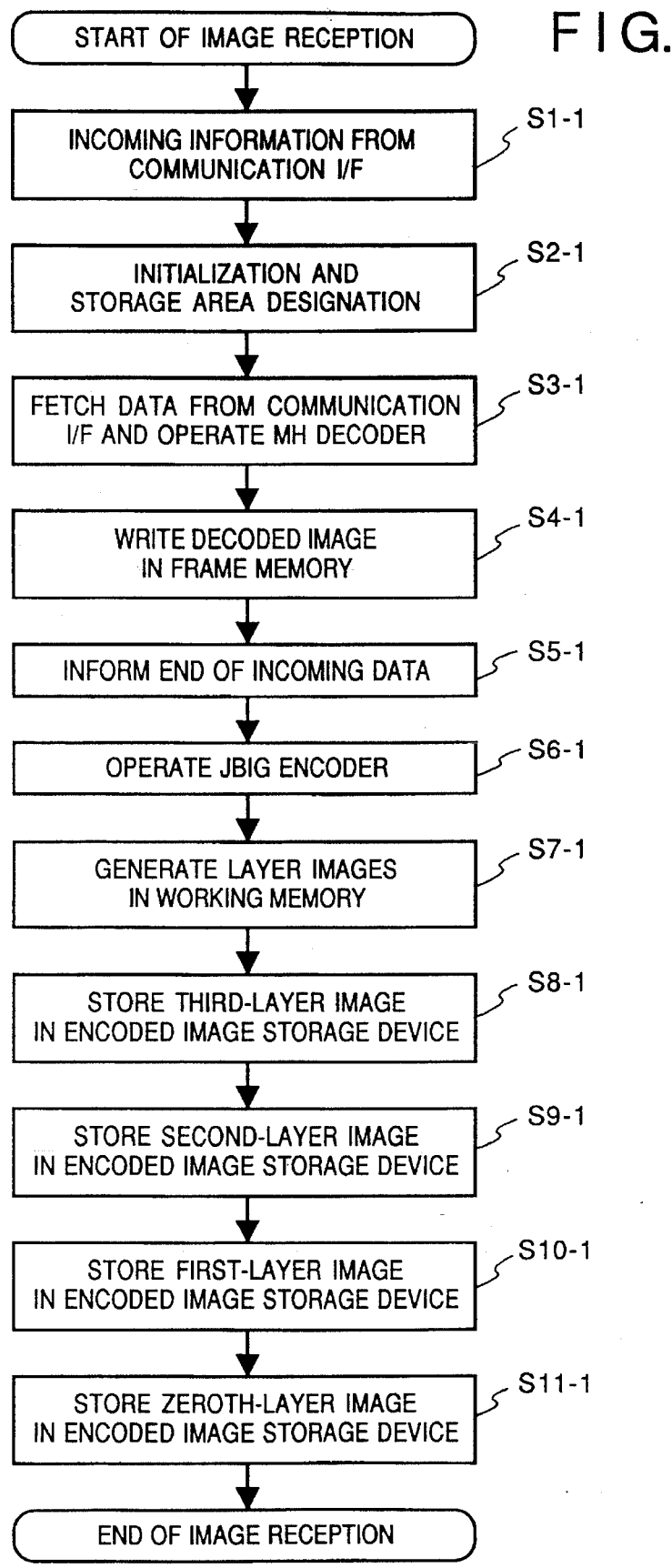
FIG. 7 is a flow chart showing an operation of the terminal apparatus according to the first embodiment.
Figure 8:
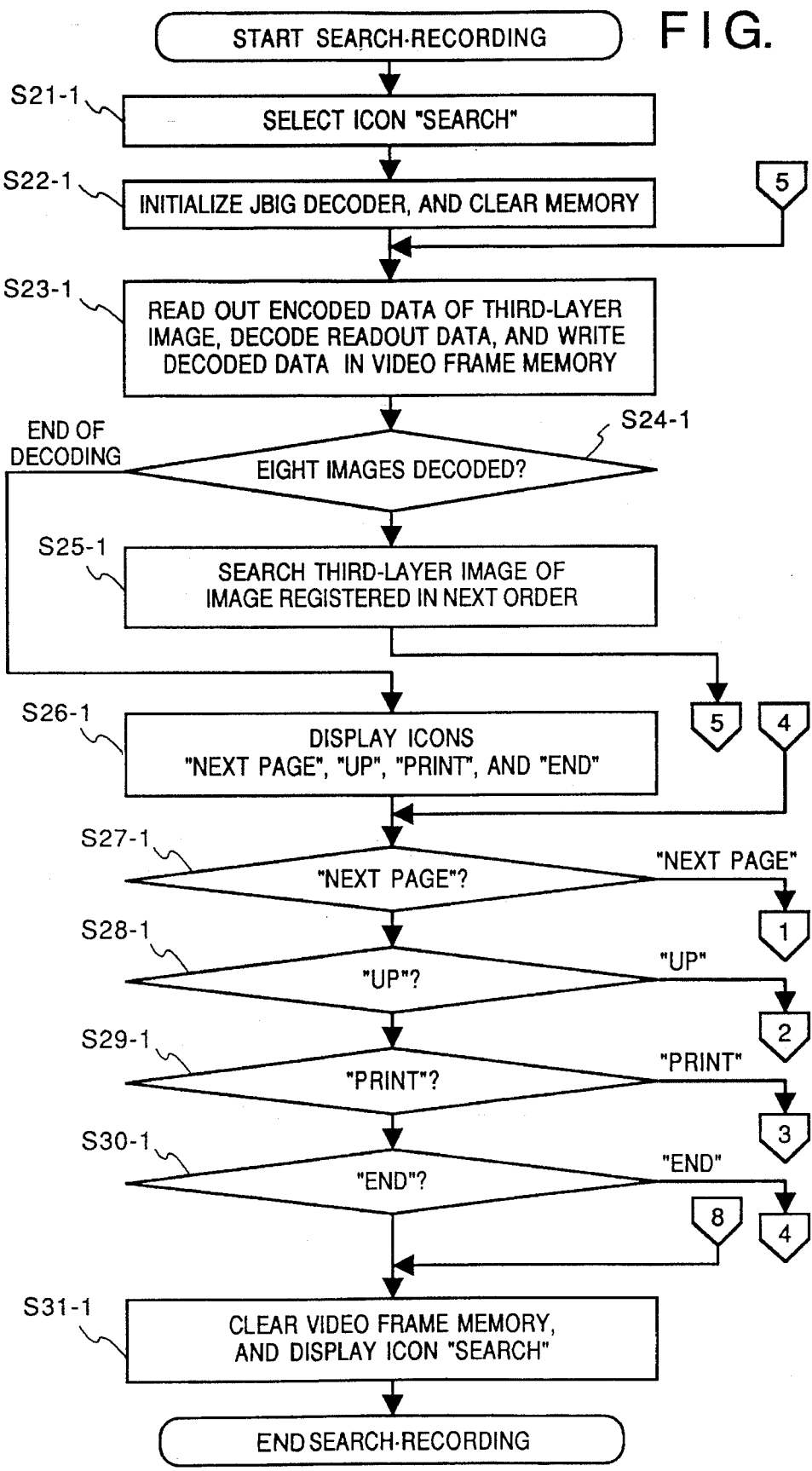
FIGS. 8 to 13 are flow charts showing image searching and image recording operations in the terminal apparatus according to the first embodiment.
Figure 9:
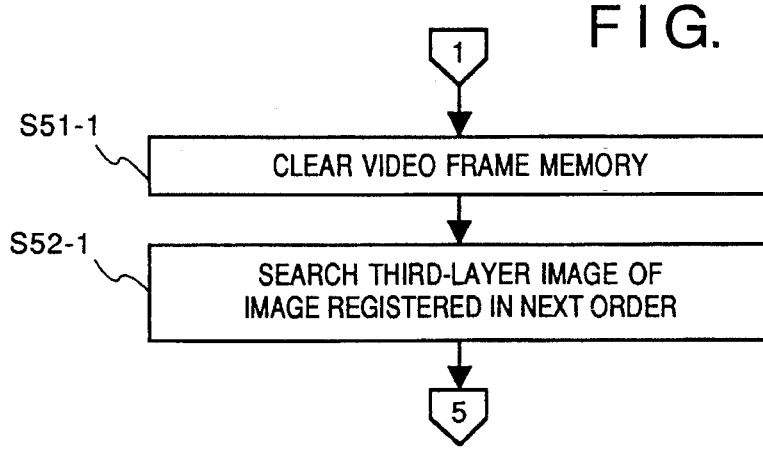
Figure 10:
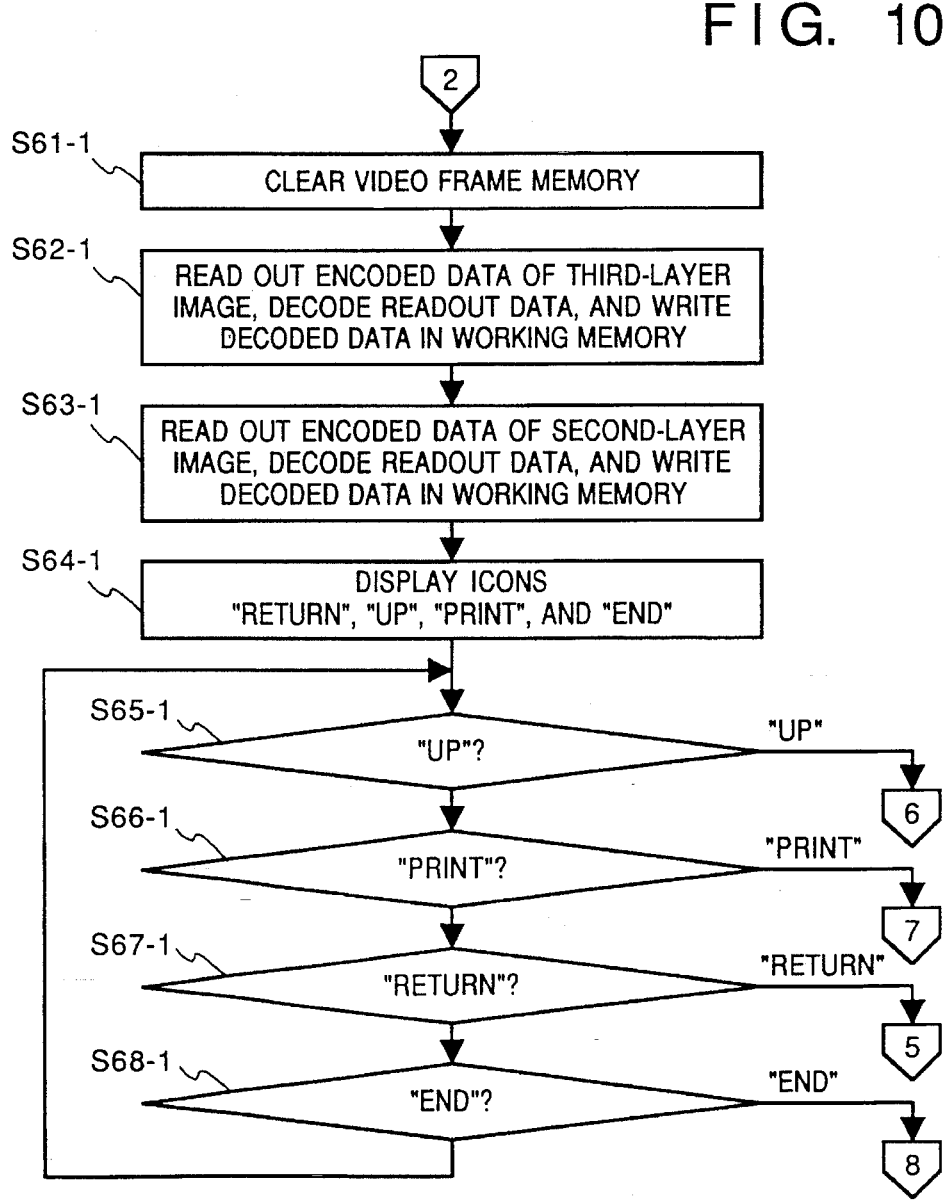
Figure 11:
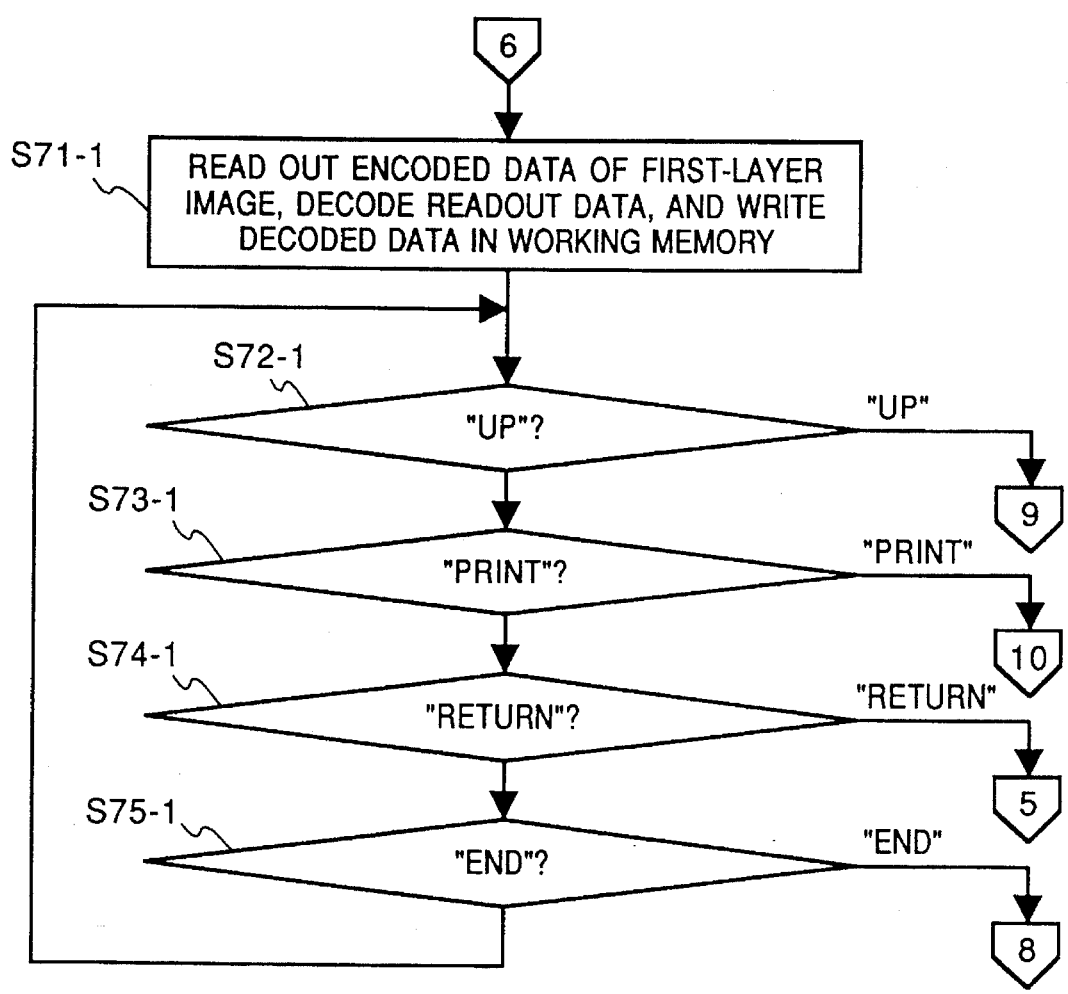

The operation of the terminal apparatus according to this embodiment will be described below with reference to the flow chart of FIG. 7. In FIG. 7, when data is transmitted from the communication line 1 to the terminal apparatus as a receiving terminal, the communication interface 2 informs the presence of incoming data to the CPU 13 (step S1-1). The CPU 13 initializes the MH decoder 3, the frame memory 4, the JBIG encoder 5, and the working memory 8, and assures an encoded data storage area in the storage device 6 (step S2-1). Note that the CPU 13 also manages image data stored in the storage device 6.

The CPU 13 instructs the communication interface 2 to fetch MH-encoded data, and the fetched data is supplied to the MH decoder 3 (step S3-1). The MH decoder sequentially reads and decodes the MH-encoded data, and writes the decoded data in the frame memory 4 (step S4-1). The end of transmitted encoded data is informed from the communication interface 2 to the CPU 13 (step S5-1).

After the MH decoder 3 decodes all the fetched image data, the CPU 13 operates the JBIG encoder 5 (step S6-1) to generate layer images in the order of first-, second-, and third-layer images, and stores these images in the working memory 8 (step S7-1). Thereafter, the JBIG encoder 5 reads out the third-layer image from the working memory 8, encodes the readout image, and stores the encoded data in a predetermined area of the storage device 6 on the basis of an instruction from the CPU 13 in step S8-1. Subsequently, the encoder 5 reads out the second-layer image from the working memory 8, encodes the readout image with reference to the third-layer image simultaneously read out from the working memory 8, and stores the encoded data in a predetermined area of the storage device 6 on the basis of an instruction from the CPU 13 (step S9-1). Similarly, the encoder 5 encodes the first-layer image, and stores the encoded data in a predetermined area of the storage device 6 on the basis of an instruction from the CPU 13 (step S10-1).

Finally, the JBIG encoder 5 reads out a zeroth-layer image from the frame memory 4, encodes the readout image with reference to the first-layer image read out from the working memory 8, and stores the encoded data in a predetermined area of the storage device 6 on the basis of an instruction from the CPU 13 (step S11-1). Upon completion of encoding of the zeroth-layer image, the data reception operation from the communication line 1 is ended.

The operations in image searching and image recording modes in the terminal apparatus according to this embodiment will be described below.

FIGS. 8 to 13 are flow charts showing the operations of the CPU 13 in the image searching and image recording modes. In the terminal apparatus of this embodiment, the display 10 displays an icon for designating a searching mode according to an instruction from the CPU 13. A user selects the icon for designating the searching mode by, e.g., clicking it using the mouse 11 (step S21-1 in FIG. 8). The CPU 13 initializes the JBIG decoder 7, and clears the video frame memory 9 upon detection of this selection (step S22-1). Note that a portion obtained by excluding a margin portion for displaying icons from the entire screen of the display 10 is divided into eight portions, and icons "next page", "UP", "print", and "end" are displayed on the margin portion (step S26-1).

In steps S23-1 and S24-1, the CPU 13 sequentially reads out encoded data of third-layer images of a maximum of eight non-displayed images from the storage device 6 in the order of registration. The CPU 13 supplies the readout data to the JBIG decoder 7 to reproduce the third-layer images, writes the reproduced images in the divided areas on the video frame memory 9 so as not to overlap each other, and causes the display 10 to display the content of the memory 9.

A user observes the displayed images, and if desired data is not displayed, he or she clicks the icon "next page" using the mouse 11 (step S27-1). Upon detection of this clicking, the CPU 13 clears the video frame memory 9 (step S51-1 in FIG. 9), reads out encoded data of third-layer images of the next eight images from the storage device 6 in the order of registration, and executes the same display processing as described above (step S52-1).

On the other hand, when the user cannot determine based on the third-layer images whether or not a given displayed image is a desired image, and wants to display the image at a higher resolution, he or she clicks the corresponding third-layer image, and then clicks the icon "UP" (step S28-1). Upon detection of this clicking, the CPU 13 clears the video frame memory 9 (step S61-1), and reads out encoded data of the third-layer image of the selected image from the storage device 6. The CPU 13 causes the JBIG decoder 7 to decode the readout data, and writes the decoded third-layer image in the working memory 8 (step S62-1). Then, the CPU 13 reads out encoded data of the second-layer image of the selected image, causes the JBIG decoder 7 to decode the readout data with reference to the third-layer image in the working memory 8, writes the decoded second-layer image in an area, excluding the icon display margin area, of the video frame memory 9, and causes the display 10 to display the content of the memory 9 (step S63-1). When the size of the second-layer image exceeds the size of the display, it is partially displayed.

In step S64-1, the CPU 13 causes the display 10 to display the icons "UP", "print" and "return" on the icon margin portion on the screen. When the user cannot determine based on the second-layer image whether or not the displayed image is a desired image, and wants to display the image at a higher resolution, he or she selects the icon "UP" (step S65-1). Upon detection of the selection of this icon, the CPU 13 causes the display to display the first-layer image by the same processing as the above-mentioned processing (step S71-1 in FIG. 11). After the processing in step S71-1, when the user further selects the icon "UP" (step S72-1), the control enters processing shown in FIG. 13.

On the other hand, when the user determines that the displayed image is a desired image, and wants to print the displayed image, he or she clicks the icon "print" in step S66-1. Upon detection of this clicking, the CPU 13 reads out encoded data of an image having a higher resolution than that of the selected image from the storage device 6, causes the JBIG decoder 7 to decode the read out data with reference to the layer image in the working memory 8, and writes the decoded data in the working memory 8. The CPU 13 repeats these operations until the corresponding zeroth-layer image is decoded (steps S83-1 and S84-1 in FIG. 12). Upon completion of decoding of the zeroth-layer image, the CPU 13 sequentially reads out the zeroth-layer image from the working memory 8, and supplies the readout image to the high-resolution printer 12. The high-resolution printer 12 prints the input image data on a paper sheet as a recording medium (step S85-1).

When the user determines that the displayed image is not a desired image, and clicks the icon "return" using the mouse 11, the CPU 13 clears the video frame memory 9, reads out encoded data of the eight third-layer images which were displayed before the cleared second-layer image from the storage device 6, and executes the same display processing as the initial third-layer image display processing (step S23-1). When the user can determine a desired image from the displayed third-layer images, he or she clicks the desired third-layer image using the mouse 11, and then clicks the icon "print" (step S29-1).

Figure 12:
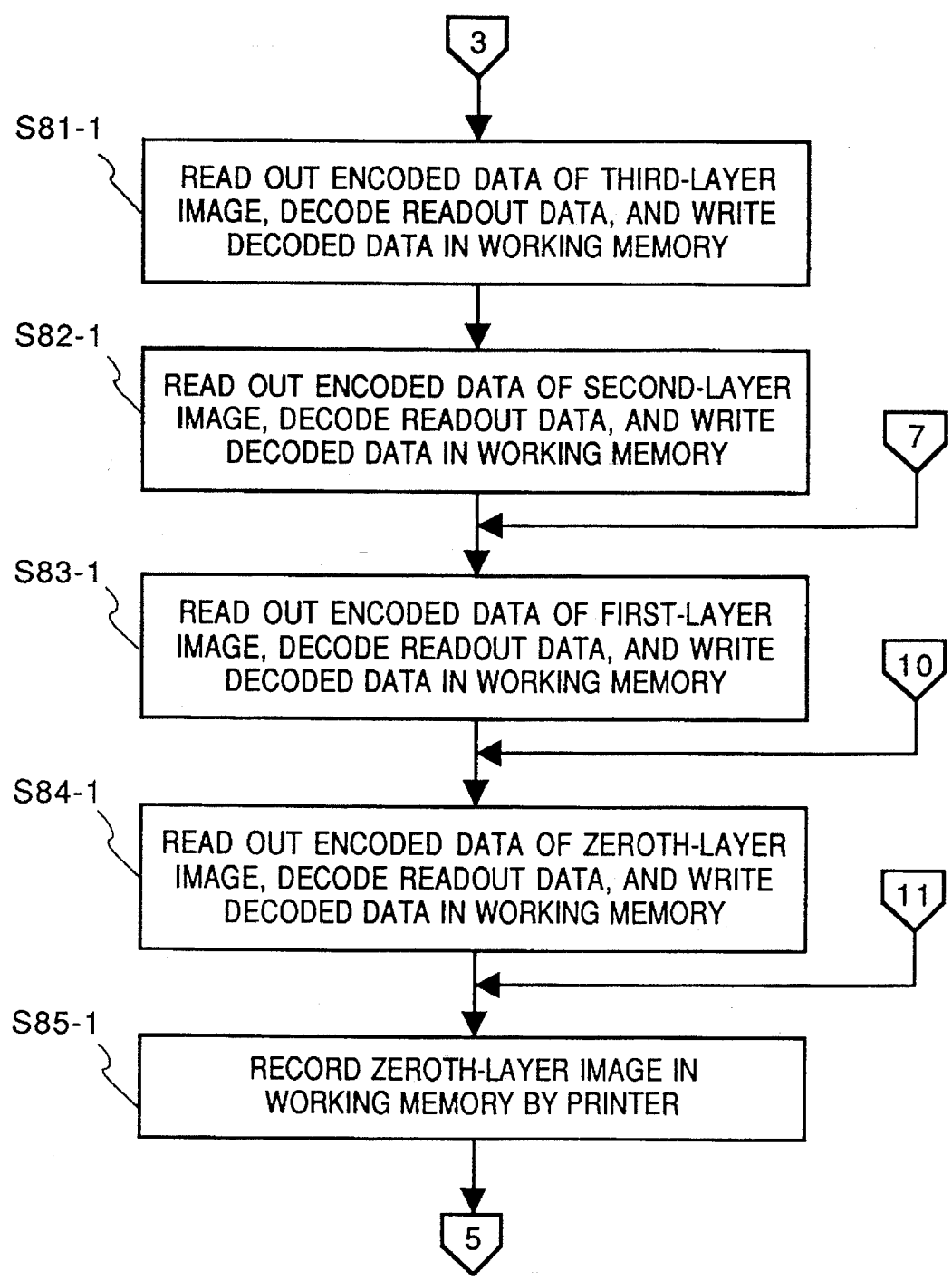
Figure 13:
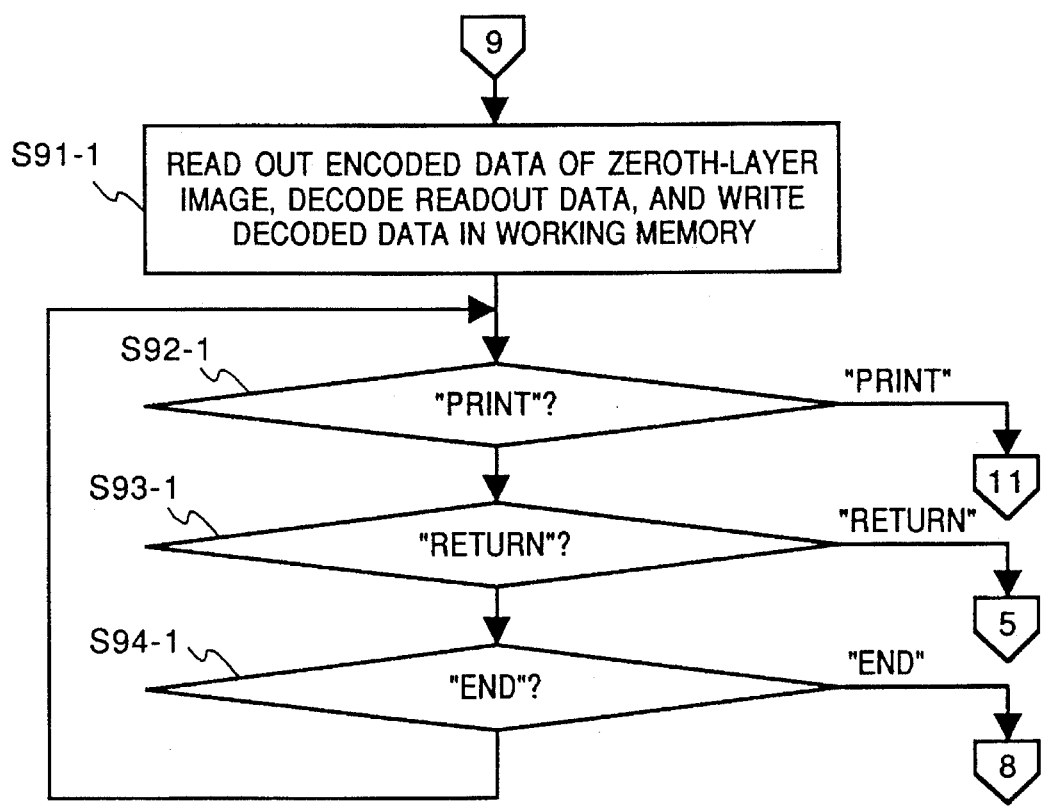

Upon detection of clicking of the icon "print", the CPU 13 reads out encoded data of the selected third-layer image from the storage device 6, supplies the readout data to the JBIG decoder 7, and writes the decoded image in the working memory 8 (step S81-1 in FIG. 12). Subsequently, in step S82-1, the CPU 13 reads out encoded data of the corresponding second-layer image from the storage device 6, supplies the readout data to the JBIG decoder 7 to decode the data with reference to the third-layer image in the working memory 8, and writes the decoded image in the working memory 8.

Furthermore, in step S83-1, the CPU 13 reads out encoded data of the corresponding first-layer image from the storage device 6, supplies the readout data to the JBIG decoder 7 to decode the data with reference to the second-layer image in the working memory 8, and writes the decoded image in the working memory 8. In step S84-1, the CPU 13 reads out encoded data of the corresponding zeroth-layer image from the storage device 6, supplies the readout data to the JBIG decoder 7 to decode the data with reference to the first-layer image in the working memory 8, and writes the decoded image in the working memory 8.

In this manner, upon completion of decoding of the zeroth-layer image, the CPU 13 sequentially reads out the zeroth-layer image from the working memory 8, and supplies the readout data to the high-resolution printer 12. The high-resolution printer 12 prints the input image data on a paper sheet (step S85-1). When the searching operation is completed, the user selects the icon "end" using the mouse 11. Upon detection of this selection, the CPU 13 clears the video frame memory 9, and displays the icon "search" thus ending the searching-printing operation.

As described above, according to this embodiment, sequentially encoded received image data is converted into encoded data having different resolutions using hierarchical encoding, and the encoded data is decoded with reference to a layer image of another layer until a desired image is obtained, thus easily realizing an image display operation matching with the resolution of the display.

[Second Embodiment]

The second embodiment of the present invention will be described below.

Figure 14:
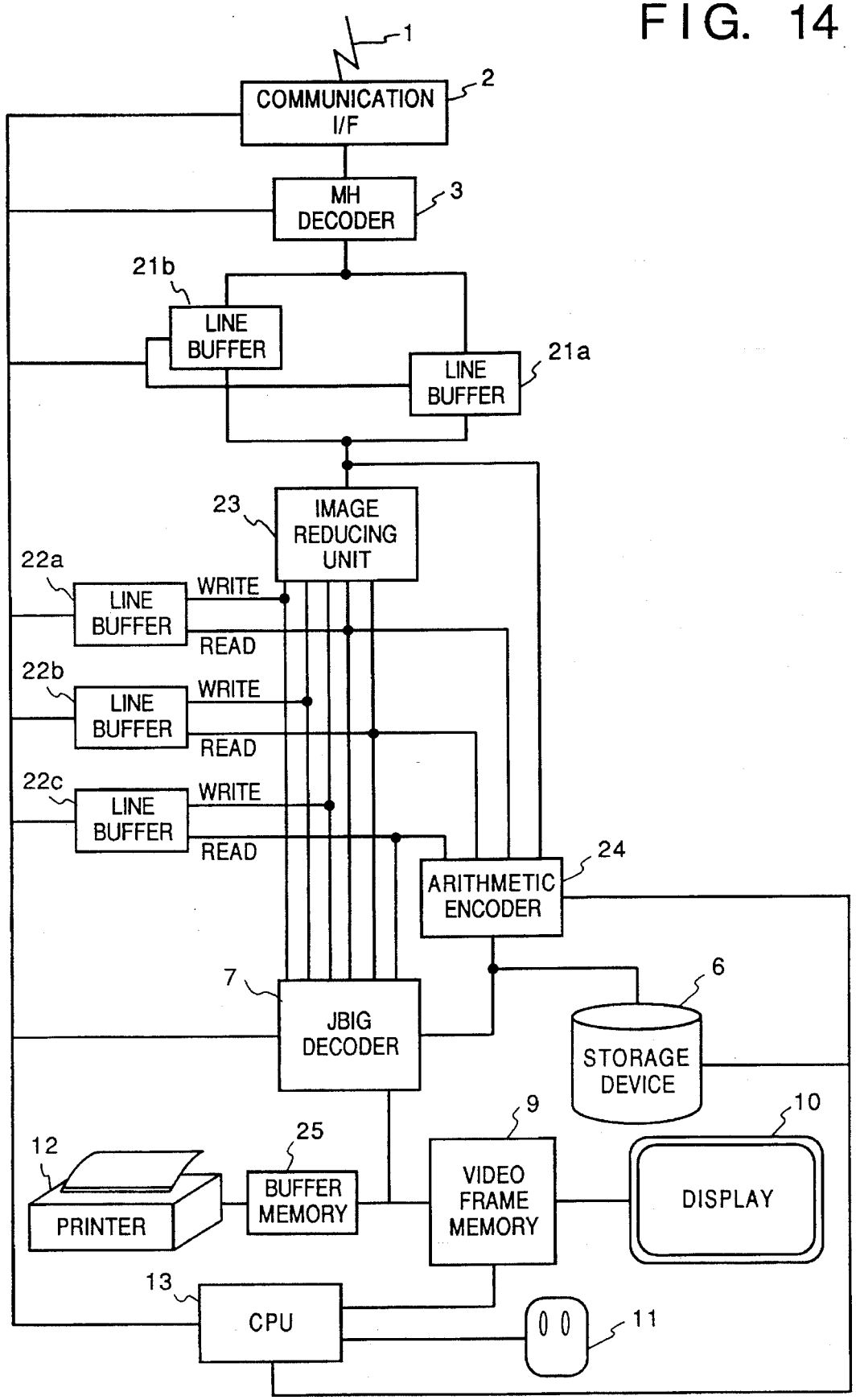
FIG. 14 is a block diagram showing an arrangement of an image communication receiving terminal apparatus according to the second embodiment of the present invention.

FIG. 14 is a block diagram showing an arrangement of an image communication receiving terminal apparatus (to be referred to as a terminal apparatus hereinafter) according to the second embodiment of the present invention. The same reference numerals in FIG. 14 denote the same parts as in the terminal apparatus according to the first embodiment, and a detailed description thereof will be omitted. Like in the first embodiment, a binary black-and-white image is assumed to be an object to be processed. It is also assumed that sequential encoding adopts MH encoding, and a hierarchical encoding method adopts a JBIG method. Furthermore, the hierarchical encoding is performed up to a third-layer image (⅛ reduced scale).

Referring to FIG. 14, reference numerals 21$a$ and 21$b$ denote line buffers each for 33 lines. Reference numeral 22$a$ denotes a line buffer for 17 lines (½ length) of a first-layer image generated based on a zeroth-layer image; 22$b$, a line buffer for nine lines (¼ length) of a second-layer image; and 22$c$, a line buffer for four lines (⅛ length) of a third-layer image. Reference numeral 23 denotes an image reduction unit for reducing an image to ½ in the vertical and horizontal directions according to an image reduction algorithm (PRES method) used in the JBIG algorithm.

Figure 15:
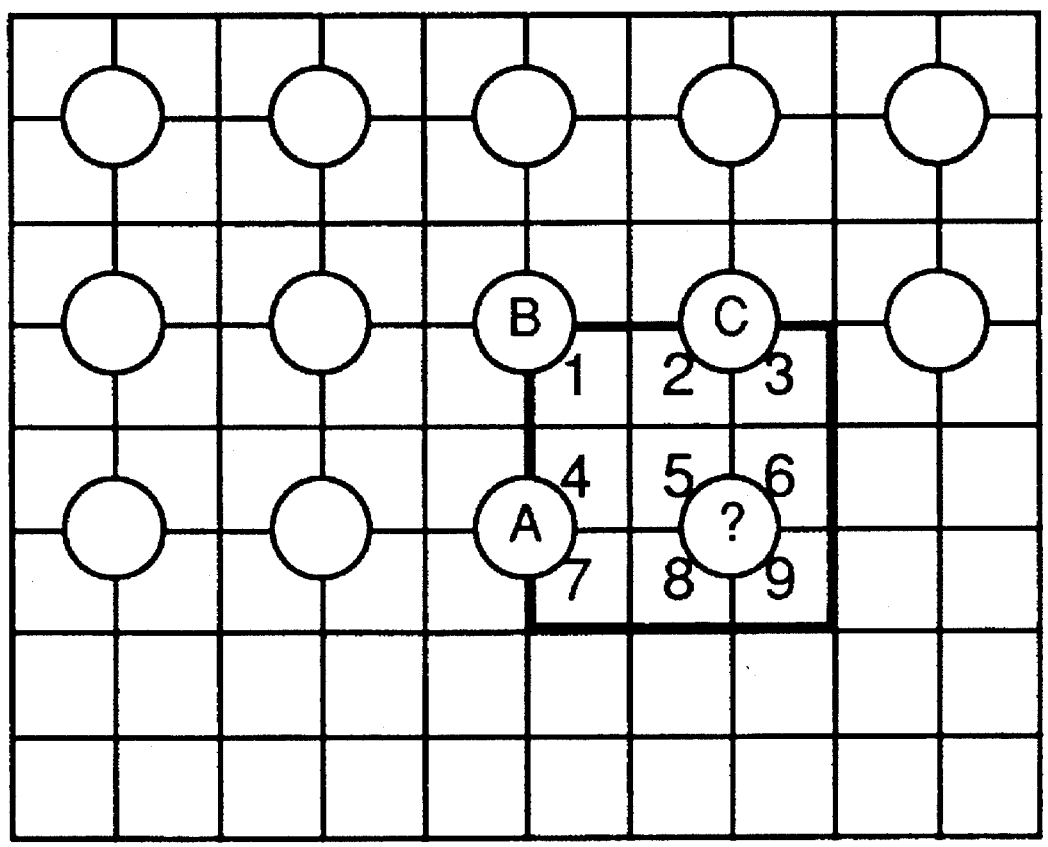
FIG. 15 is a view showing the relationship of reference pixels in the PRES method.

FIG. 15 shows the relationship of reference pixels in the PRES method. In FIG. 15, each square box represents a pixel of a high-resolution layer image, and a circle in the box represents a pixel of a low-resolution layer image. In this case, a pixel to be reduced (the pixel with "?" in FIG. 15) is determined with reference to 3×3 pixels (denoted by reference numerals 1 to 9) of the high-resolution layer image and 3 pixels (denoted by reference symbols A to C) of the low-resolution layer image within a bold frame.

In FIG. 14, reference numeral 24 denotes an arithmetic encoder for arithmetic-encoding a third-layer image without referring to an image of another layer, and arithmetic-encoding a layer image other than the third-layer image with reference to a layer image having a lower resolution than that of the image to be encoded by one layer.

An operation executed when encoded data is input from a communication line 1 in the terminal apparatus of this embodiment will be described below.

Figure 16A:
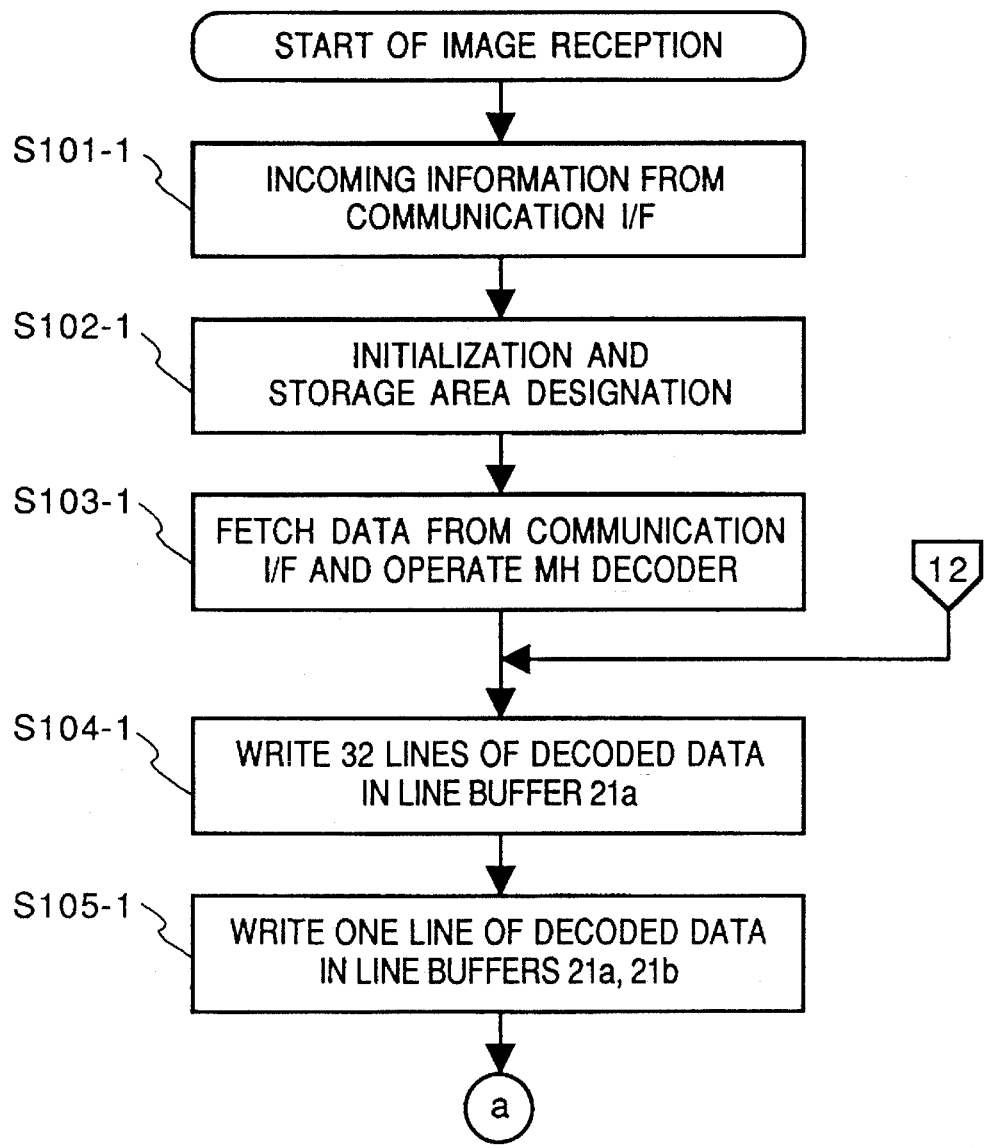
FIGS. 16A and 16B and FIGS. 17A and 17B are flow charts showing operations of the terminal apparatus according to the second embodiment.
Figure 16B:
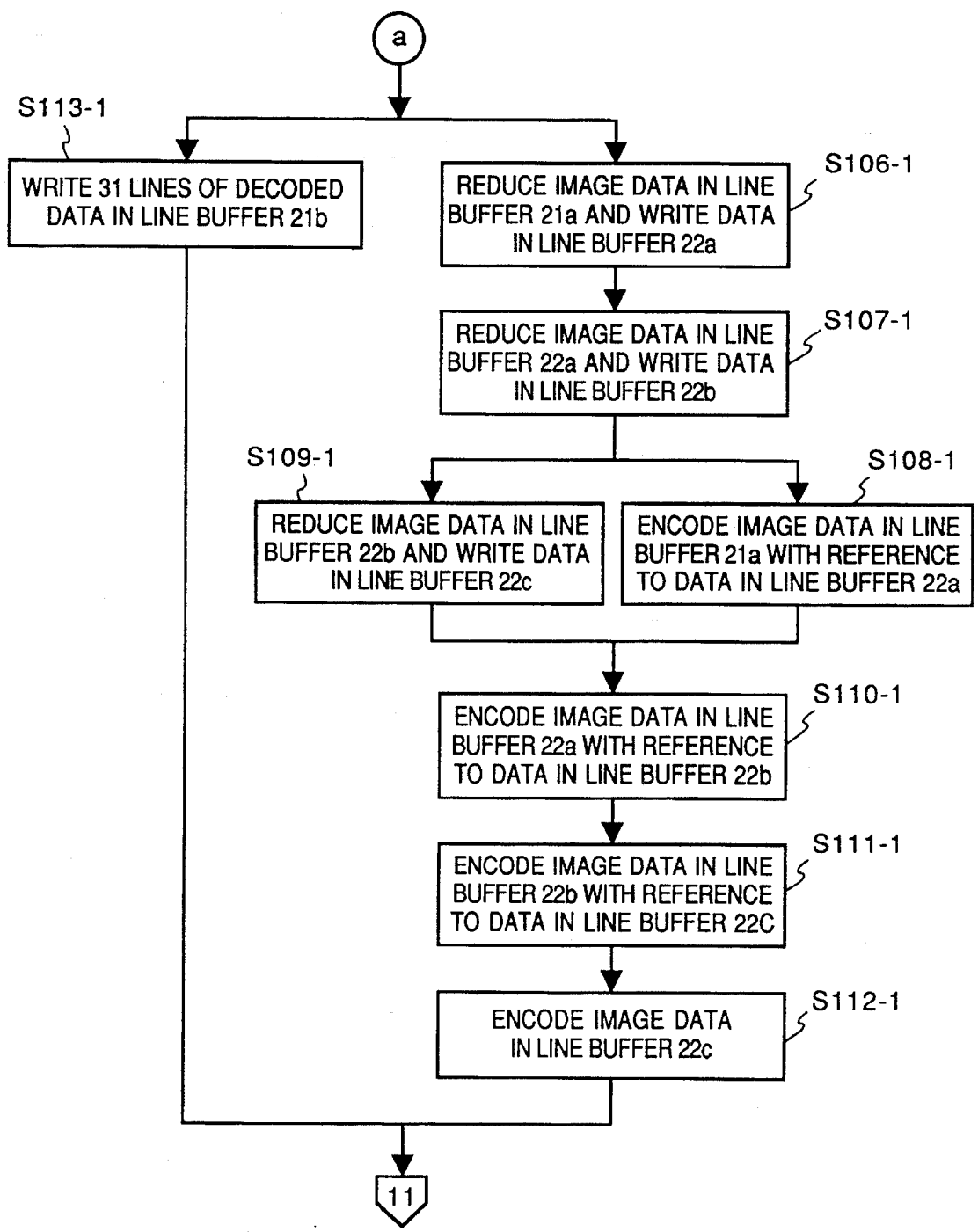

FIGS. 16A and 16B and FIGS. 17A and 17B are flow charts showing an operation of a CPU 13 of the terminal apparatus according to this embodiment. In FIG. 16A, when data is transmitted from the communication line 1 to a receiving terminal, a communication interface 2 informs the presence of incoming data to the CPU 13 (step S101-1). Then, the CPU 13 initializes an MH decoder 3, the line buffers 21$a$, 21$b$, 22$a$, 22$b$, and 22$c$, and the arithmetic encoder 24, and assures encoded data storage areas of layer images in a storage device 6 (step S102-1). In step S103-1, the CPU 13 instructs the communication interface 2 to fetch MH-encoded data, and the fetched data is supplied to the MH decoder 3. The MH decoder 3 sequentially reads and decodes the MH-encoded data, and writes the decoded data in one of the line buffers 21*a* and 21*b* (steps S104-1 and S105-1).

The operation of the CPU 13 of the terminal apparatus will be described below with reference to FIGS. 18A to 18E, which show data write operations in the line buffers 21*a* and 21*b*.

Figure 18A:
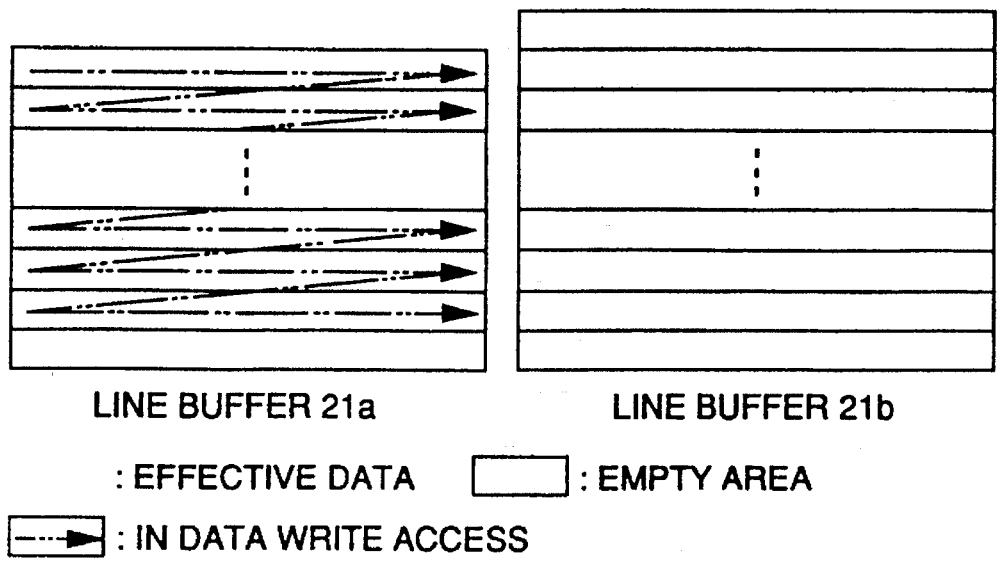
Figure 18B:
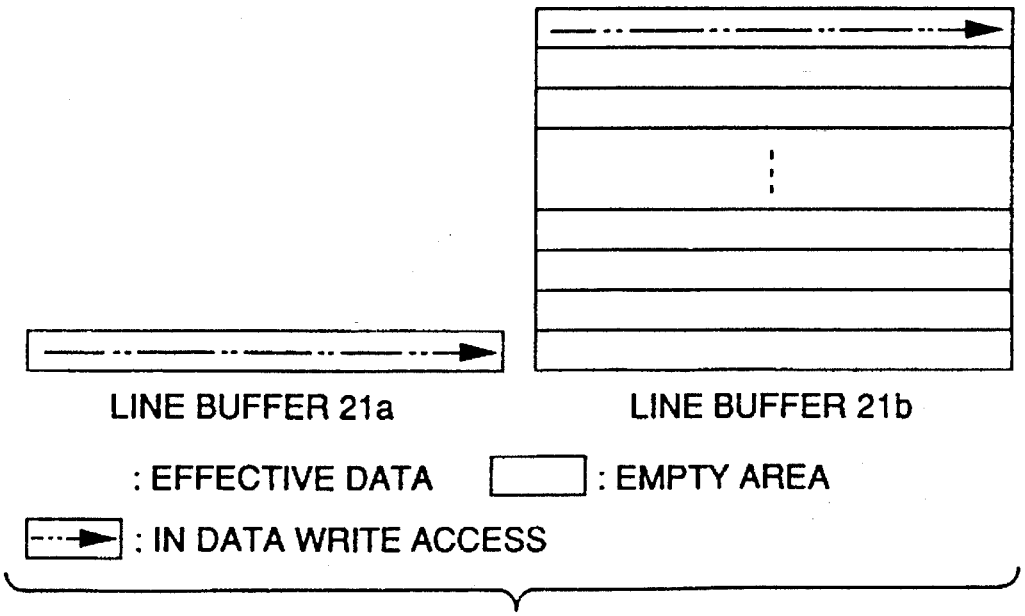
Figure 18E:
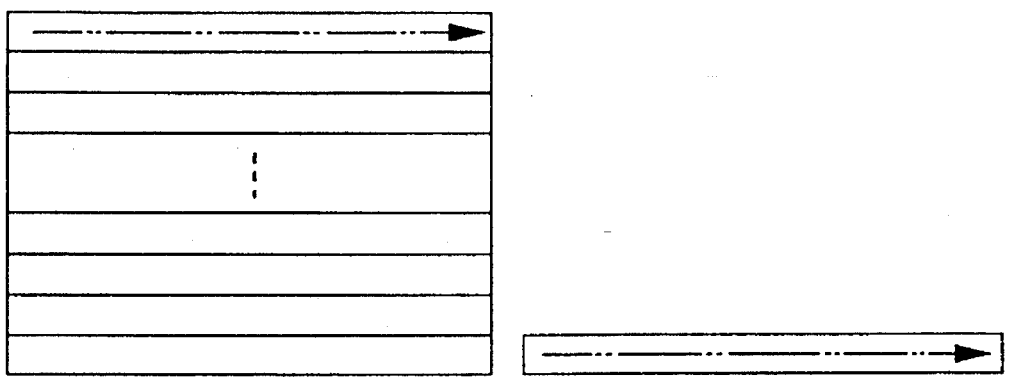

The first image data decoded by the MH decoder 3 is written in the second line of the line buffer 21*a* (see FIG. 18A). Note that the first line of the line buffer 21*a* is filled with data "0" representing white pixels upon initialization by the CPU 13. Then, the output from the MH decoder 3 is stored in the second to the 32nd lines of the line buffer 21*a* in units of lines (FIG. 18B). Data for the 33rd line is simultaneously written in the 33rd line of the line buffer 21*a* and the first line of the line buffer 21*b* (FIG. 18C).

Upon completion of the write access to the 33rd line of the line buffer 21*a*, the line buffer 21*a* is set in a read mode. Subsequently, data for the 34th to 64th lines of the decoded image are stored in the line buffer 21*b* (step S113-1). At the same time, a zeroth-layer image in the line buffer 21*a* is reduced until a third-layer image is obtained, and encoded data obtained from the respective layer image data are stored in the storage device 6 according to an instruction from the CPU 13.

The image reduction unit 23 generates data for 16 lines of a first-layer image on the basis of the zeroth-layer image stored in the line buffer 21*a*, and stores the generated data in the second to 17th lines of the line buffer 22*a* (step S106-1). The first line of the line buffer 22*a* is filled with data "0" representing white pixels upon initialization by the CPU 13.

After the first-layer image is generated up to the 17th line of the line buffer 22*a*, the image reduction unit 23 generates data for eight lines of a second-layer image on the basis of the first-layer image stored in the line buffer 22*a*, and stores the data in the second to ninth lines of the line buffer 22*b* (step S107-1). The first line of the line buffer 22*b* is filled with data "0" representing white pixels upon initialization by the CPU 13.

After the second-layer image is generated up to the ninth line of the line buffer 22*b*, the image reduction unit 23 generates data for four lines of a third-layer image on the basis of the second-layer image stored in the line buffer 22*b*, and stores the data in the second to fifth lines of the line buffer 22*c* (step S109-1). The first line of the line buffer 22*c* is filled with data "0" representing white pixels upon initialization by the CPU 13. Parallel to this processing, the arithmetic encoder 24 encodes the zeroth-layer image in the line buffer 21*a* with reference to the first-layer image in the line buffer 22*a*. These encoded data are stored in an area on the storage device 6, which area is designated by the CPU 13 so as to store encoded data for 32 lines of the zeroth-layer image (step S108-1).

The arithmetic encoder 24 then encodes the first-layer image in the line buffer 22*a* with reference to the second-layer image in the line buffer 22*b*, and the CPU 13 stores the encoded data in an area on the storage device 6, which area is designated to store encoded data for 16 lines of the first-layer image (step S110-1).

Subsequently, the arithmetic encoder 24 encodes the second-layer image in the line buffer 22*b* with reference to the third-layer image in the line buffer 22*c*, and stores the encoded data in an area on the storage device 6, which area is designated by the CPU 13 to store encoded data for eight lines of the second-layer image (step S111-1).

The arithmetic encoder 24 encodes the third-layer image in the line buffer 22*c*, and stores the encoded data in an area on the storage device 6, which area is designated by the CPU 13 to store encoded data for four lines of the third-layer image (step S112-1). The CPU 13 manages information for four lines of the third-layer image, information for eight lines of the second-layer image, information for 16 lines of the first-layer image, and information for 32 lines of the zeroth-layer image as a group of information.

Figure 17A:
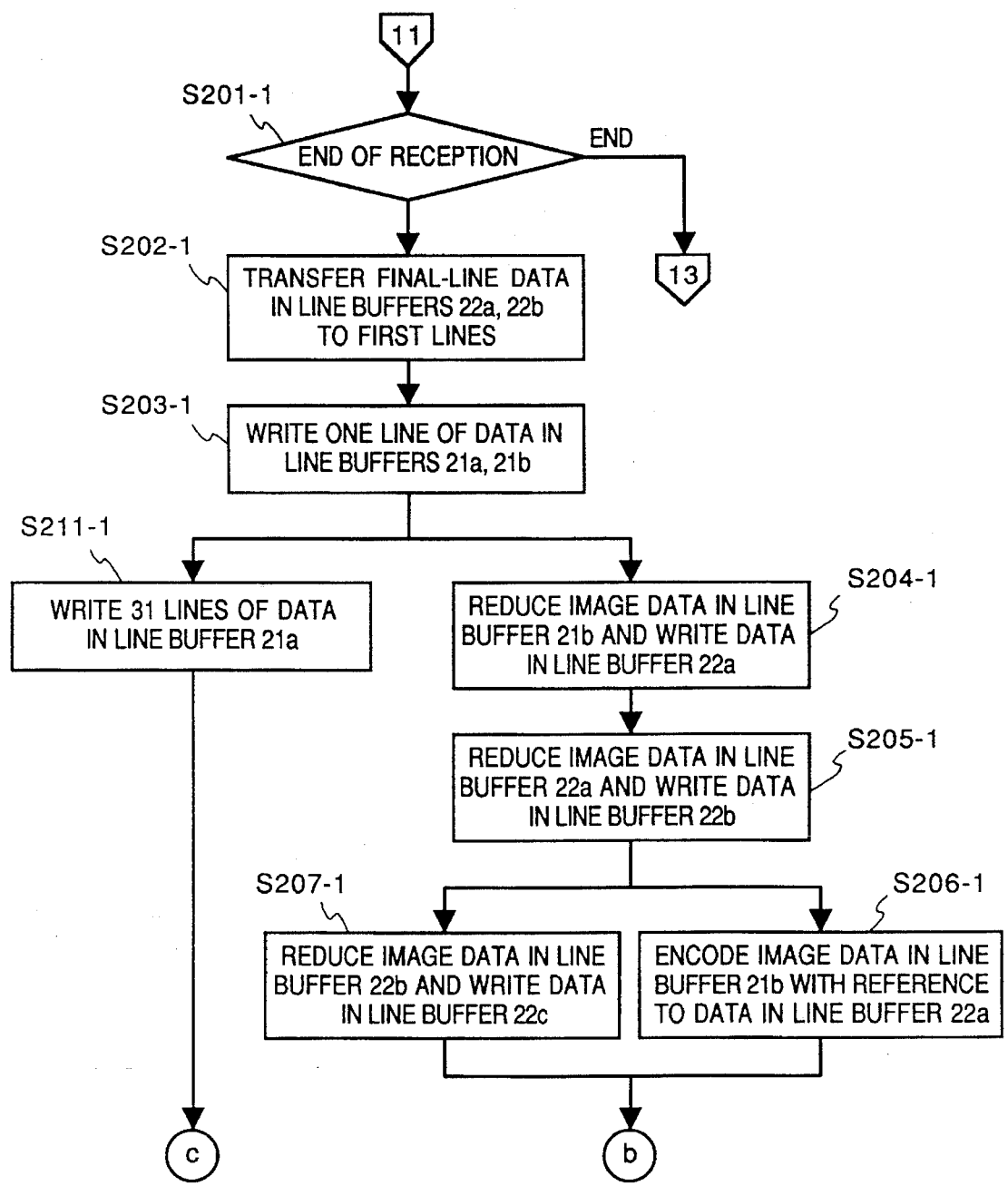

Upon completion of encoding of the third-layer image, data in the final lines of the line buffers 22*a* and 22*b* are transferred to their first lines (step S202-1 in FIG. 17A). Note that the line buffer 21*a* is cleared.

When the output from the MH decoder 3 reaches the 32nd line of the line buffer 22*b* (FIG. 18D), the line buffer 21*a* is set in a write mode, and the same line data is written in the 33rd line of the line buffer 21*b*, and the first line of the line buffer 21*a* (FIG. 18E) (step S203-1). Upon completion of this write access, the line buffer 21*b* is set in the read mode. Subsequently, data for the next 32 lines of the decoded image are stored in the line buffer 21*a*. During this interval, the zeroth-layer image in the line buffer 21*b* is sequentially reduced until the third-layer image is obtained, and encoded data obtained from the respective layer image data are stored in the storage device 6 according to an instruction from the CPU 13. In this case, the image reduction unit 23 generates data for 16 lines of the first-layer image on the basis of the zeroth-layer image stored in the line buffer 21*b*, and stores the data in the second to 17th lines of the line buffer 22*a* (step S204-1).

After the first-layer image is generated up to the 17th line of the line buffer 22*a*, the image reduction unit 23 generates data for eight lines of the second-layer image on the basis of the first-layer image stored in the line buffer 22*a*, and stores the data in the second to ninth lines of the line buffer 22*b* (step S205-1).

After the second-layer image is generated up to the ninth line of the line buffer 22*b*, the image reduction unit 23 generates data for four lines of the third-layer image on the basis of the second-layer image stored in the line buffer 22*b*, and stores the data in the second to fifth lines of the line buffer 22*c* (step S207-1). Parallel to this processing, the arithmetic encoder 24 encodes the zeroth-layer image in the line buffer 21*b* with reference to the first-layer image in the line buffer 22*a*. The encoded data are stored in the area on the storage device 6, which area is designated by the CPU 13 so as to store encoded data for 32 lines of the zeroth-layer image (step S206-1).

Figure 17B:
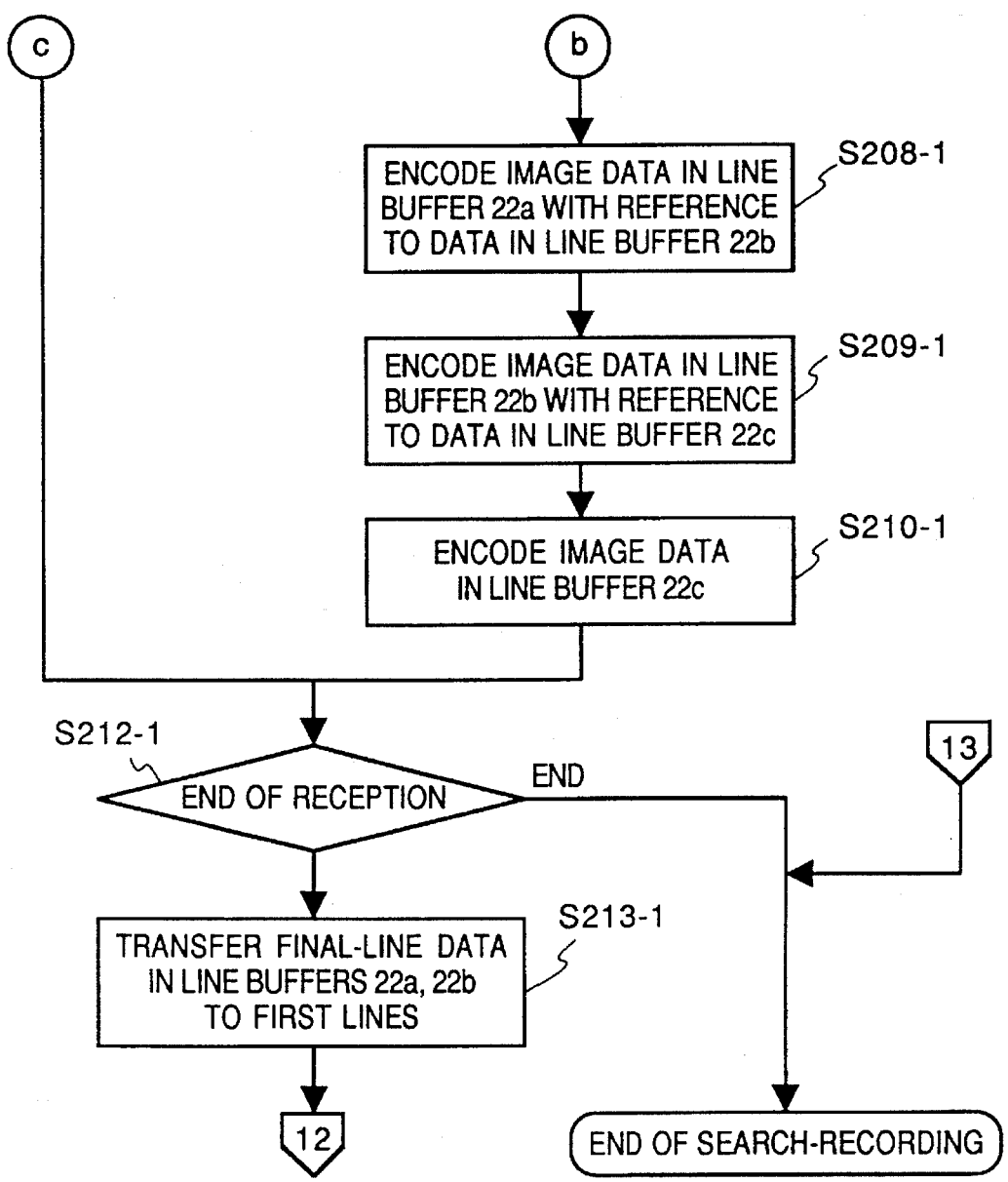

Then, the arithmetic encoder 24 encodes the first-layer image in the line buffer 22*a* with reference to the second-layer image in the line buffer 22*b*, and stores the encoded data in the area on the storage device 6, which area is designated by the CPU 13 so as to store encoded data for 16 lines of the first-layer image (step S208-1 in FIG. 17B). Subsequently, the arithmetic encoder 24 encodes the second-layer image in the line buffer 22*b* with reference to the third-layer image in the line buffer 22*c*, and stores the encoded data in the area on the storage device 6, which area is designated by the CPU 13 so as to store encoded data for eight lines of the second-layer image (step S209-1). The arithmetic encoder 24 encodes the third-layer image in the line buffer 22*c*, and stores the encoded data in the area on the storage device 6, which area is designated by the CPU 13 so as to store encoded data for four lines of the third-layer image (step S210-1).

The CPU 13 manages information for four lines of the third-layer image, information for eight lines of the second-layer image, and information for 16 lines of the first-layer image, and information for 32 lines of the zeroth-layer image as a group of information.

Upon completion of encoding of the third-layer image in the line buffer 22c, data in the final lines of the line buffers 22a and 22b are transferred to their first lines (step S213-1). Note that the line buffer 21b is cleared.

The above-mentioned processing is repeated to execute encoding in units of 32 lines of the zeroth-layer image, and encoded data are managed on the storage device 6. After encoding of the final third-layer image is completed, the reception operation from the communication line 1 is ended.

The operations in the image searching and recording modes in the storage device 6 are performed in the same manner as in the first embodiment, and will be described below without using figures.

More specifically, encoded data for four lines of each of third-layer images are sequentially read out from the storage device in the registration order of the third-layer images, and eight images are displayed. When a user cannot determine based on the third-layer images whether or not a given displayed image is a desired image, and wants to display an image at a higher resolution, he or she clicks the corresponding third-layer image, and then clicks an icon "UP". Upon detection of this clicking, the CPU 13 clears a video frame memory 9, sequentially reads out encoded data for four lines of the selected third-layer image, causes a JBIG decoder 7 to decode the readout data, and writes the decoded third-layer image in the line buffer 22c.

Then, the CPU 13 reads out encoded data for eight lines of the second-layer image at the same position of the selected image, and causes the JBIG decoder 7 to decode the readout data with reference to the third-layer image in the line buffer 22c. The CPU 13 then writes the decoded second-layer image data for eight lines at the corresponding position in an area, excluding an icon display margin area, of the video frame memory 9, and causes a display 10 to display the written data.

Thereafter, the CPU 13 sequentially processes data for the subsequent eight lines of the second-layer image, and causes the display 10 to display the processed data. When the size of the second-layer image exceeds the display size, the CPU 13 interrupts decoding, and causes the display to display icons "UP", "print", and "return" on the icon display margin portion. When the user cannot determine based on the second-layer image whether or not the displayed image is a desired image, and wants to display the image at a higher resolution, he or she selects the icon "UP". Upon detection of this selection, the CPU 13 causes the display to display the first-layer image in the same manner as described above.

When the user determines that the displayed image is a desired image, and wants to print the image, he or she clicks the icon "print". Upon detection of clicking of this icon, the CPU 13 inputs image data for four lines of the third-layer image of the selected image to the JBIG decoder 7, causes the decoder 7 to decode the input data, and writes the decoded data in the line buffer 22c. The CPU 13 inputs encoded data for eight lines of the second-layer image at the same position to the JBIG decoder 7, causes the decoder 7 to decode the input data with reference to the third-layer image in the line buffer 22c, and writes the decoded data in the line buffer 22b.

Similarly, the CPU 13 inputs encoded data for 16 lines of the first-layer image at the same position to the JBIG decoder 7, causes the decoder 7 to decode the input data with reference to the second-layer image in the line buffer 22b, and writes the decoded data in the line buffer 22a. Furthermore, the CPU 13 inputs encoded data for 32 lines of the zeroth-layer image at the same position to the JBIG decoder 7, causes the decoder 7 to decode the input data with reference to the first-layer image in the line buffer 22a, and supplies the decoded data to a buffer memory 25.

In this manner, the CPU 13 reads out encoded data of images having higher resolutions from the storage device 6, causes the JBIG decoder 7 to decode the readout data with reference to the layer images in the line buffers 22a, 22b, and 22c, and writes decoded data in the buffer memory 25. The CPU 13 sequentially reads out the zeroth-layer image from the buffer memory 25, and supplies the readout image to a high-resolution printer 12. The high-resolution printer 12 prints the supplied image data on a recording sheet.

When the user determines that the image displayed on the display is not desired image data, he or she clicks the icon "return" using a mouse 11. Upon detection of this clicking, the CPU 13 clears the video frame memory 9, reads out encoded data of the eight third-layer images which were displayed before the cleared second-layer image from the storage device 6, and executes the same display processing as the initial third-layer image display processing. When the user can determine a desired image from the displayed third-layer images, he or she clicks the desired third-layer image using the mouse 11, and then clicks the icon "print". Upon detection of clicking of the icon "print", the CPU 13 reads out encoded data of the selected third-layer image from the storage device 6, supplies the readout data to the JBIG decoder 7, and writes the decoded image in the line buffer 22c.

Subsequently, the CPU 13 reads out encoded data of the corresponding second-layer image from the storage device 6, supplies the readout data to the JBIG decoder 7 to decode the data with reference to the third-layer image in the line buffer 22c, and writes the decoded image in the line buffer 22b. Furthermore, the CPU 13 reads out encoded data of the corresponding first-layer image from the storage device 6, supplies the readout data to the JBIG decoder 7 to decode the data with reference to the second-layer image in the line buffer 22b, and writes the decoded image in the line buffer 22a.

The CPU 13 reads out encoded data of the corresponding zeroth-layer image from the storage device 6, supplies the readout data to the JBIG decoder 7 to decode the data with reference to the first-layer image in the line buffer 22a, and writes the decoded image in the buffer memory 25. The CPU 13 sequentially reads out the zeroth-layer image from the buffer memory 25, and supplies the image to the high-resolution printer 12. The high-resolution printer 12 prints the input image data on a recording sheet.

When the user can determine a desired image from the third-layer images, he or she clicks the desired third-layer image using the mouse 11, and then clicks the icon "print". Upon detection of clicking of this icon, the CPU 13 reads out encoded data of the selected image, inputs the readout data to the JBIG decoder 7 to generate a decoded image in units of 32 lines using the line buffers 22a, 22b, and 22c, and causes the high-resolution printer 12 to print the decoded image on a recording sheet.

As described above, according to this embodiment, after received image data is divided into a plurality of areas, and the divided data are stored, the data are converted into hierarchically encoded data, and the encoded data are decoded with reference to an image of another layer until a desired image is obtained, thus saving the memory capacity for storing image data.

In each of the first and second embodiments, processing for a binary black-and-white image has been described. However, the present invention is not limited to this. For example, an image to be processed may be a multi-value image. The sequential encoding is not limited to MH encoding. For example, data may be encoded by various other encoding methods, for example, MMR encoding or arithmetic encoding for binary data, or DPCM, DCT transform encoding, or vector quantization for multi-value data.

As the communication line, an analog line, an ISDN line, and the like may be used. As the printer, a page printer such as a laser beam printer, a thermal transfer printer, or the like, a serial printer such as an ink-jet printer (including a bubble-jet printer), or the like, may be used.

Input sequentially encoded image data is not limited to MH-encoded data, but may be data encoded by an MR, MMR, or so-called ADCT method. In particular, when ADCT data is input, since DC and AC components are sequentially transmitted in units of predetermined block lines, they may be separated into DC and AC components, and may be stored for one frame.

Furthermore, the present invention is not limited to the specific encoding unit, and hence, is not limited to the specific capacities of the line buffers of the second embodiment.

[Third Embodiment]

The third embodiment of the present invention will be described in detail below.

Figure 19A:
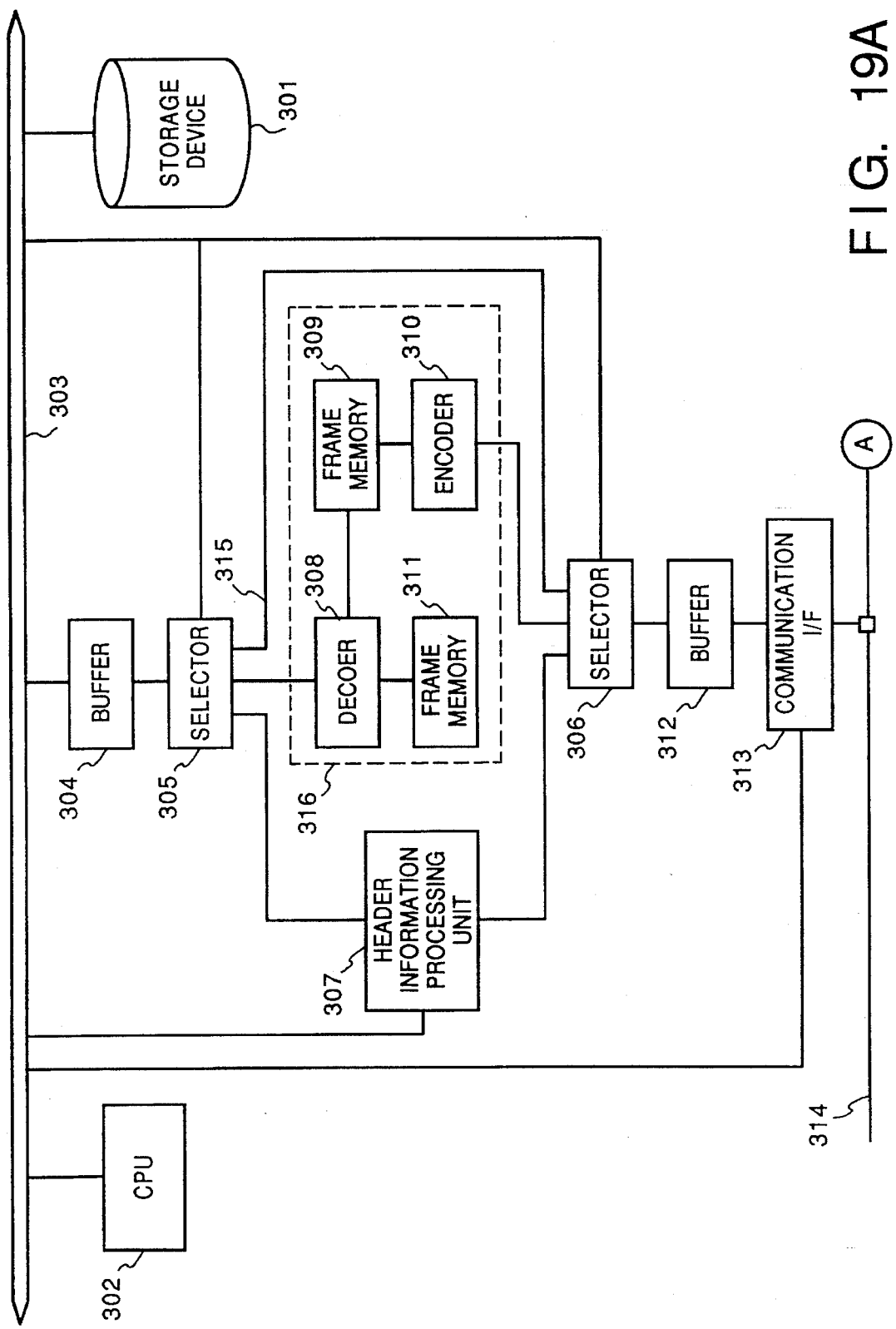
FIGS. 19A and 19B are block diagrams showing arrangements of an image communication apparatus and an encoded data converter according to the third embodiment of the present invention.
Figure 19B:
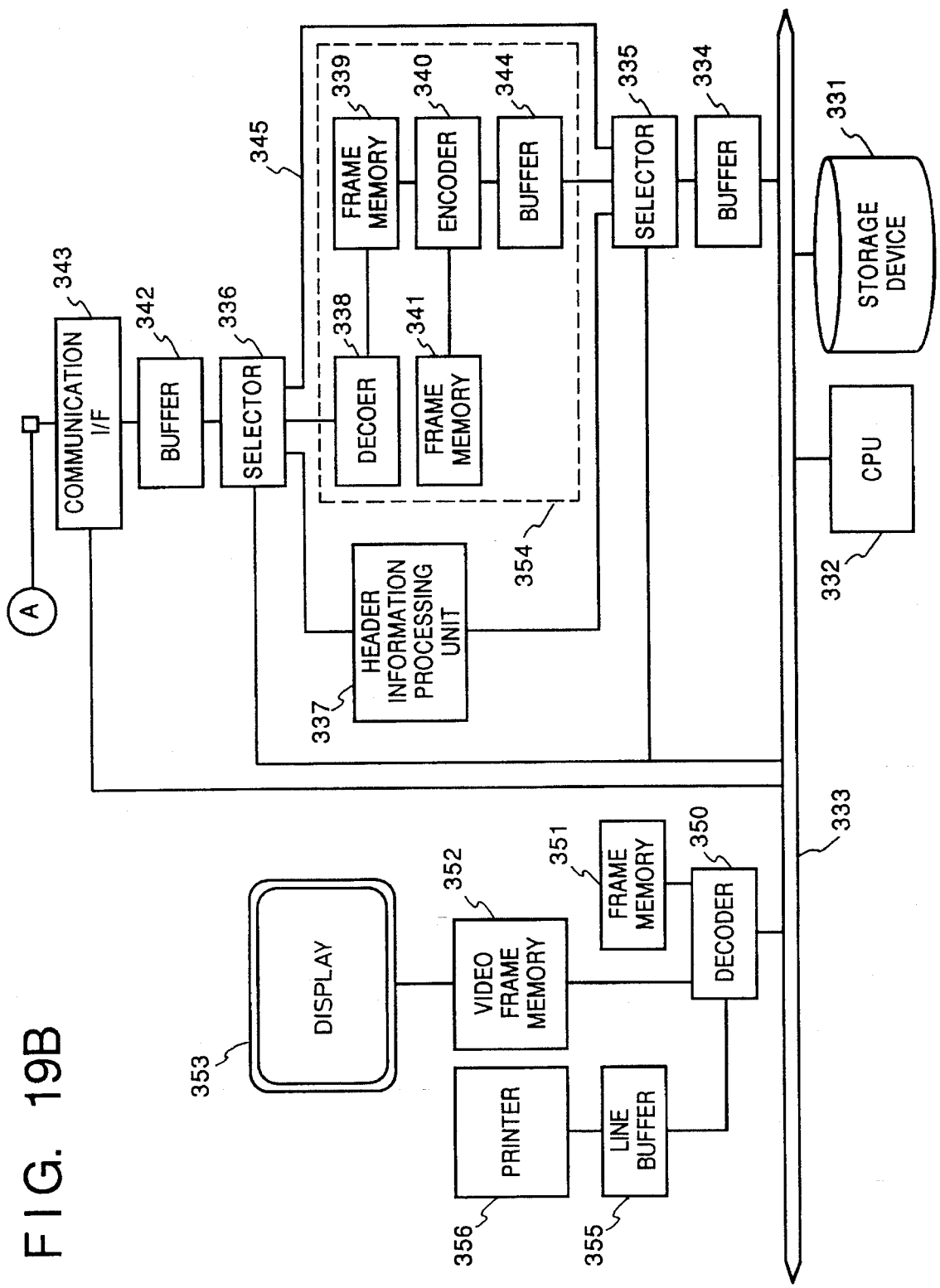

FIGS. 19A and 19B show arrangements of an image communication apparatus and an encoded data converter according to this embodiment. In FIGS. 19A and 19B, reference numerals 301 and 331 denote storage devices comprising, e.g., magnetic storage devices for storing hierarchically encoded image data. Reference numerals 302 and 332 denote CPUs for controlling the corresponding apparatuses; and 303 and 333, buses for transmitting encoded data, instructions from the CPUs 302 and 332, and the like. Reference numerals 304, 312, 334, 342, and 344 denote buffers each for storing encoded data for one image. Reference numerals 305, 306, 335, and 336 denote selectors. Of these selectors, the selectors 305 and 336 are selectors for outputting one input to one of three outputs, and the selectors 306 and 335 are selectors for selecting one of three inputs, and outputting the selected input. For the sake of descriptive convenience, the above-mentioned JBIG algorithm of the binary image hierarchical encoding method will be exemplified as an encoding method. Reference numerals 307 and 337 denote header information processing units, each of which analyzes a header portion of encoded data, and can change the content of header information according to an instruction from the CPU 302 or 332. Reference numerals 308 and 338 denote decoders for decoding encoded data to generate a reproduced image. Reference numerals 309, 311, and 339 denote frame buffers for storing a reproduced image.

Reference numeral 310 denotes an encoder for reading and encoding an image. Reference numeral 340 denotes an encoder for reading an image to generate a reduced image, and encoding the reduced image. Reference numeral 341 denotes a frame memory for storing the reduced image generated by the encoder 340. Reference numerals 313 and 343 denote communication interfaces for exchanging, e.g., encoded data with a communication line. Reference numeral 314 denotes a communication line such as an ISDN, a telephone line, a computer network or the like. Reference numerals 315 and 345 denote data lines. Portions surrounded by dotted lines 316 and 354 correspond to encoded data converters. Reference numeral 350 denotes a decoder for decoding hierarchically encoded data; and 351, a frame memory for storing an intermediate layer image for decoding. Reference numeral 352 denotes a video frame memory for storing a decoded image; and 353, a display for displaying the content of the video frame memory 352. Reference numeral 355 denotes a line buffer for storing a decoded image for a plurality of lines; and 356, a printer.

In the apparatus of this embodiment, an image communication at a receiving terminal is performed in procedures shown in FIGS. 20A to 20C and FIGS. 21A to 21G, and an image communication at a transmitting terminal is performed in procedures shown in FIGS. 22A and 22B and FIGS. 23A to 23C.

Figure 20A:
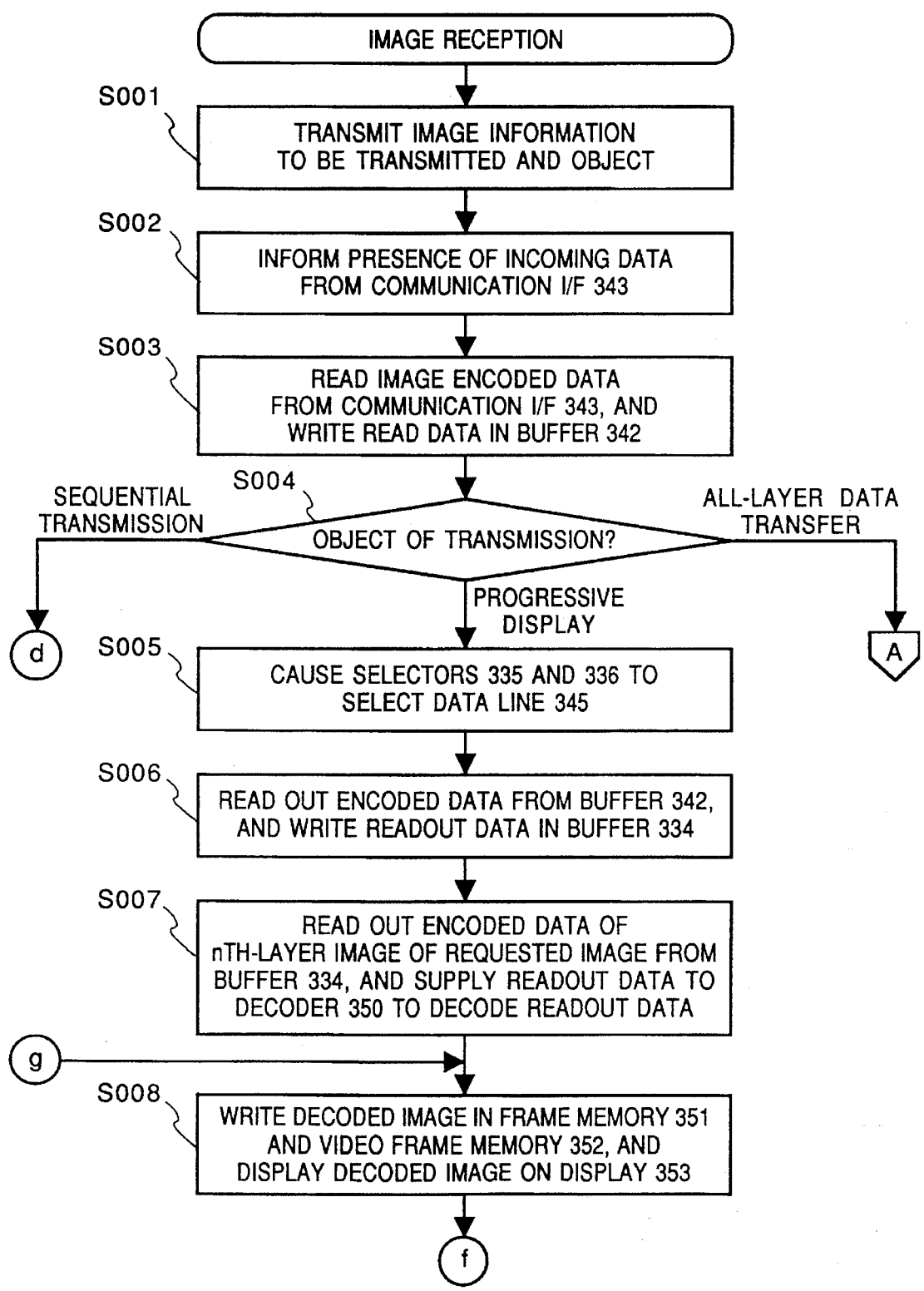

The CPU 332 of the receiving terminal sends a desired image and an object as a request onto the communication line 314 via the bus 333 and the communication interface 343 (S001 in FIG. 20A).

The encoded data request is input to the communication interface 313. The communication interface 313 informs the presence of the incoming request to the CPU 302 via the bus 303 (S101 in FIG. 22A). The CPU 302 checks if the object of the request is to perform a progressive display operation, a sequential transmission operation, or an all-layer data transfer operation (S102).

If the object of the request is to perform the progressive display operation, the CPU 302 instructs the selector 305 to select the data line 315 as its output, and the selector 306 to select the data line 315 as its input (S103).

Encoded data of an nth-layer image having the lowest resolution in the plane data format of the request image is read out from the storage device 301, and is stored in the buffer 304 via the bus 303 (S104). Then, the content of the buffer 304 is stored in the buffer 312 via the data line 315 (S105). Thereafter, the content of the buffer 312 is sent onto the communication line 314 via the communication interface 313 (S106).

The CPU 332, which issued the request, receives encoded data at the communication interface 343 via the communication line 314, and the communication interface 343 informs the presence of incoming encoded data to the CPU 332 (S002). The CPU 332 stores encoded data of the nth-layer image in the buffer 342 (S003). Since the object of the communication is to perform the progressive display operation, the CPU 332 switches the output of the selector 336 to the data line 345, and switches the input of the selector 335 to the data line 345 according to the checking result in step S004 (S005). The CPU 332 writes the encoded data of the nth-layer image stored in the buffer 342 in the buffer 334 via the data line 345 (S006). The CPU 332 sends the encoded data to the decoder 350 via the bus 333, and the decoder 350 decodes the input encoded data (S007). A decoded image is written in the frame memory 351 and the video frame memory 352, and is displayed on the display 353 (S008).

Furthermore, when a user instructs to display a layer image having a higher resolution in step S009, the CPU 332 sends a request for the same image with the object to perform the progressive display to the transmitting terminal via the communication interface 343 (S010).

Figure 22A:
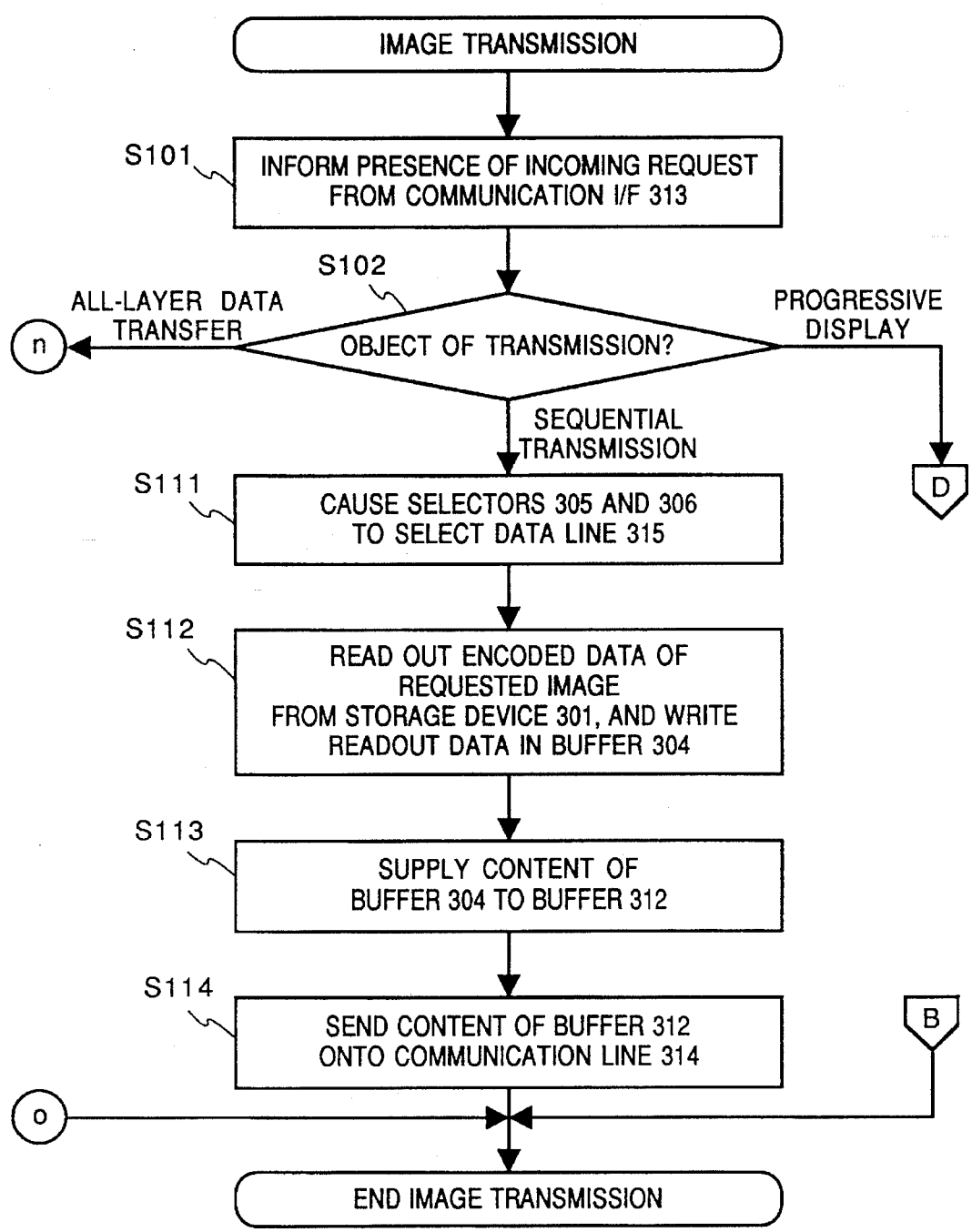
FIGS. 22A and 22B and FIGS. 23A to 23C are flow charts showing an image communication procedure in a transmitting terminal in the apparatus according to the third embodiment.
Figure 22B:
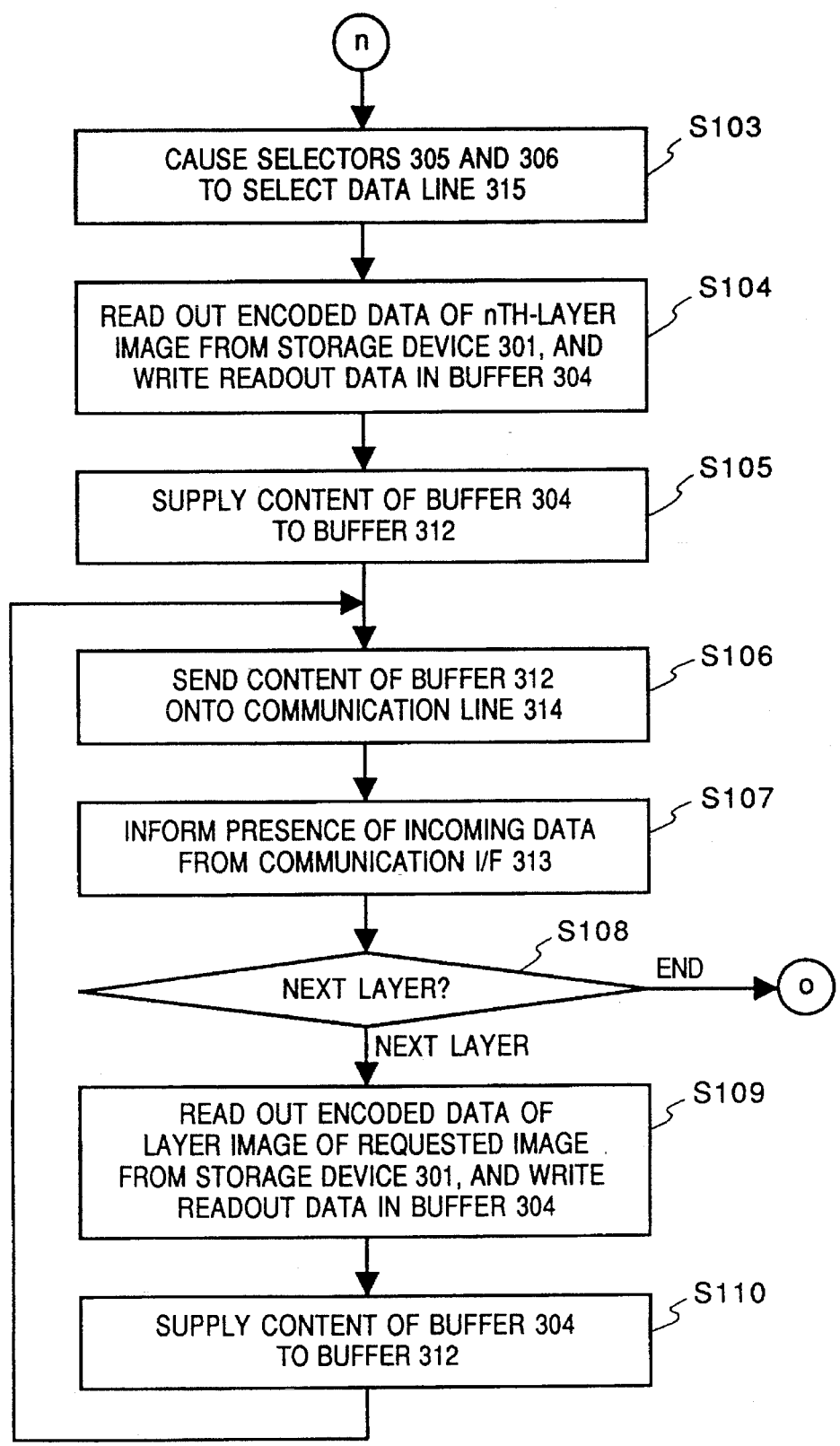

The communication interface 313 of the transmitting terminal receives the request, and sends the received request to the CPU 302 (S107 in FIG. 22B). Since the request is a request for the next layer, the CPU 302 reads out encoded data of the next layer from the storage device 301, and sends the readout data to the buffer 304 (S109). The CPU 302 then stores the content of the buffer 304 in the buffer 312 via the data line 315 (S110). The CPU then sends the content of the buffer 312 via the communication interface 313 and the communication line 314 in the same manner as described above (S106).

Figure 20B:
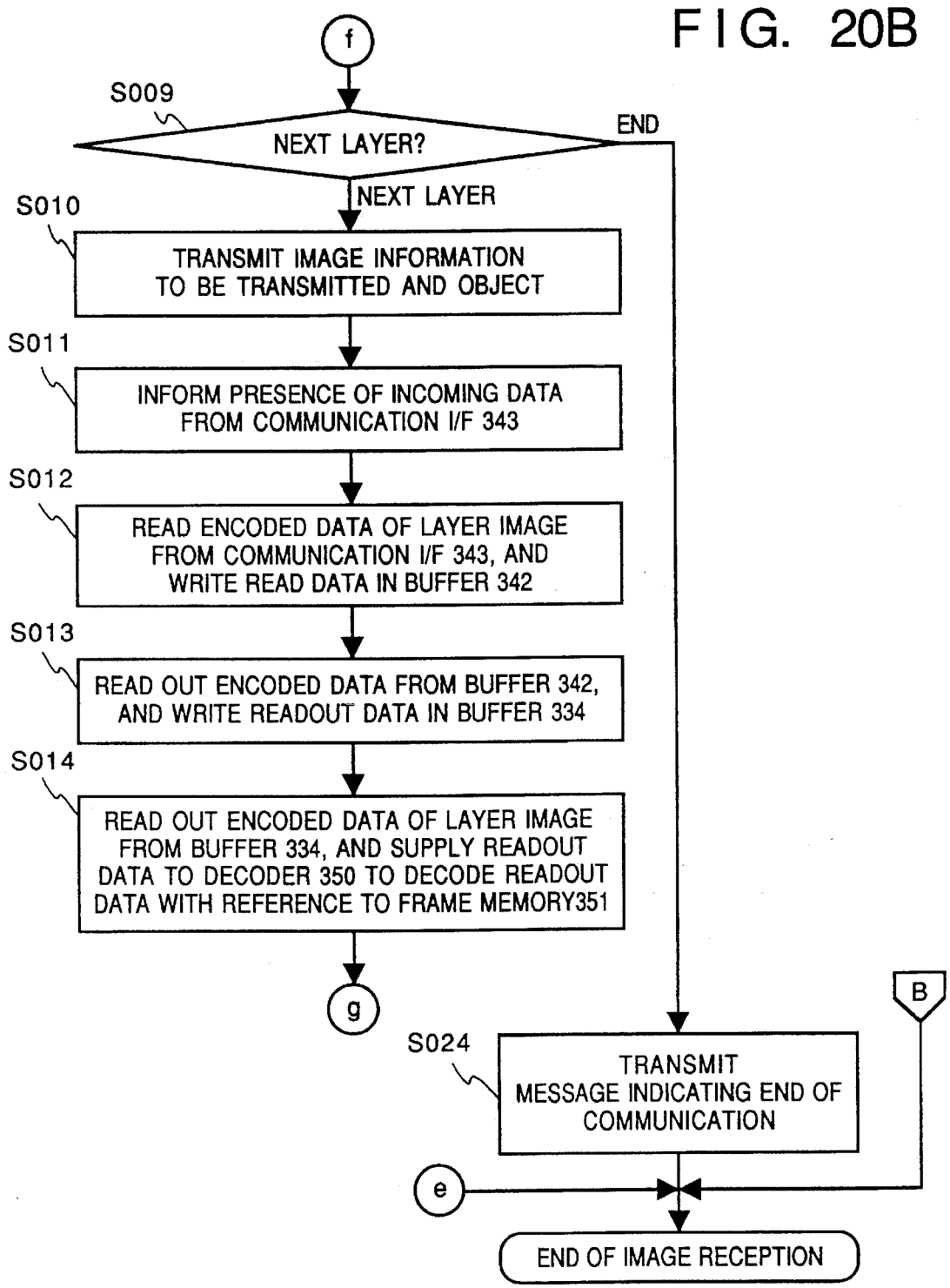
Figure 20C:
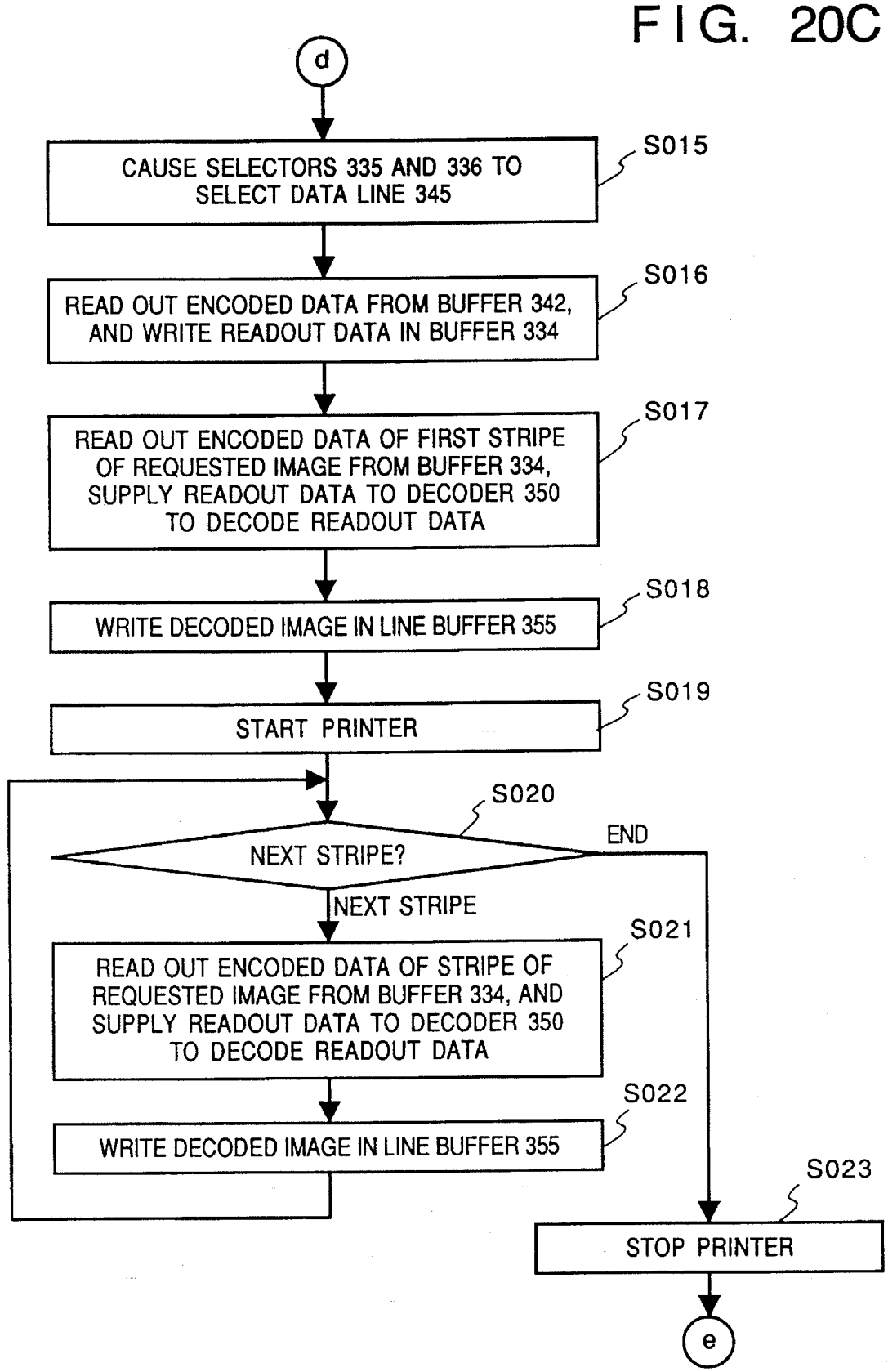
Figure 21A:
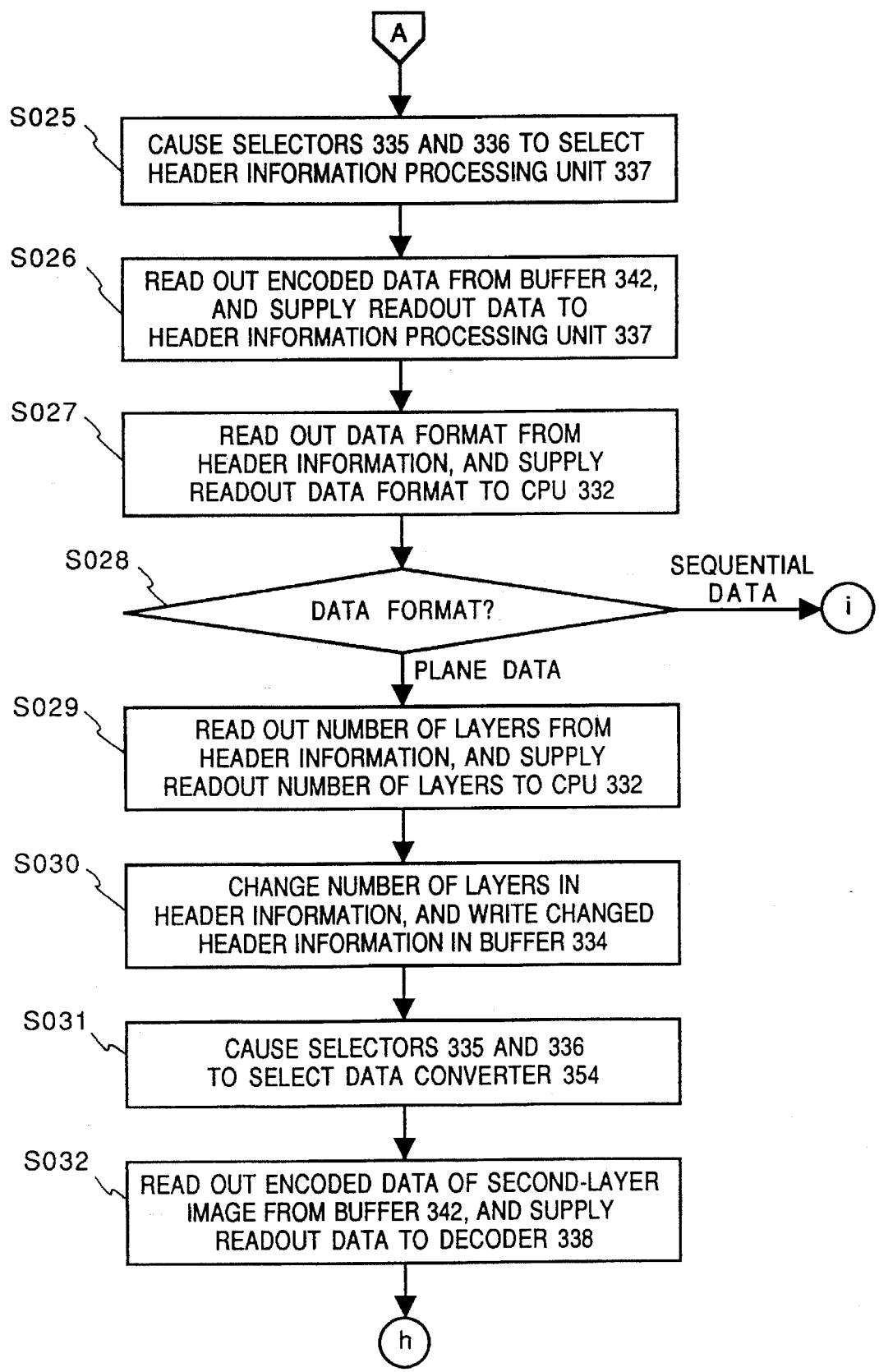
Figure 21B:
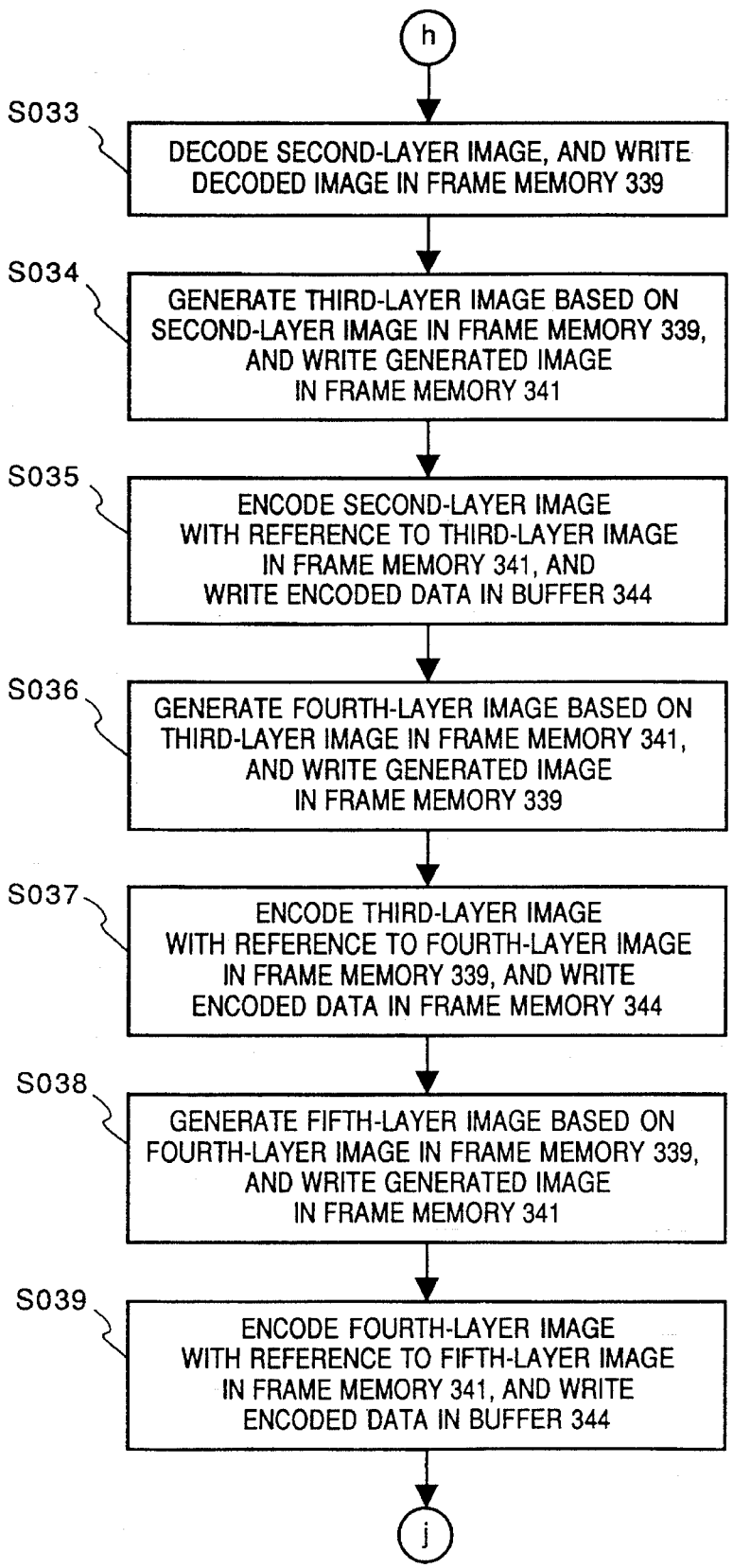
Figure 21C:
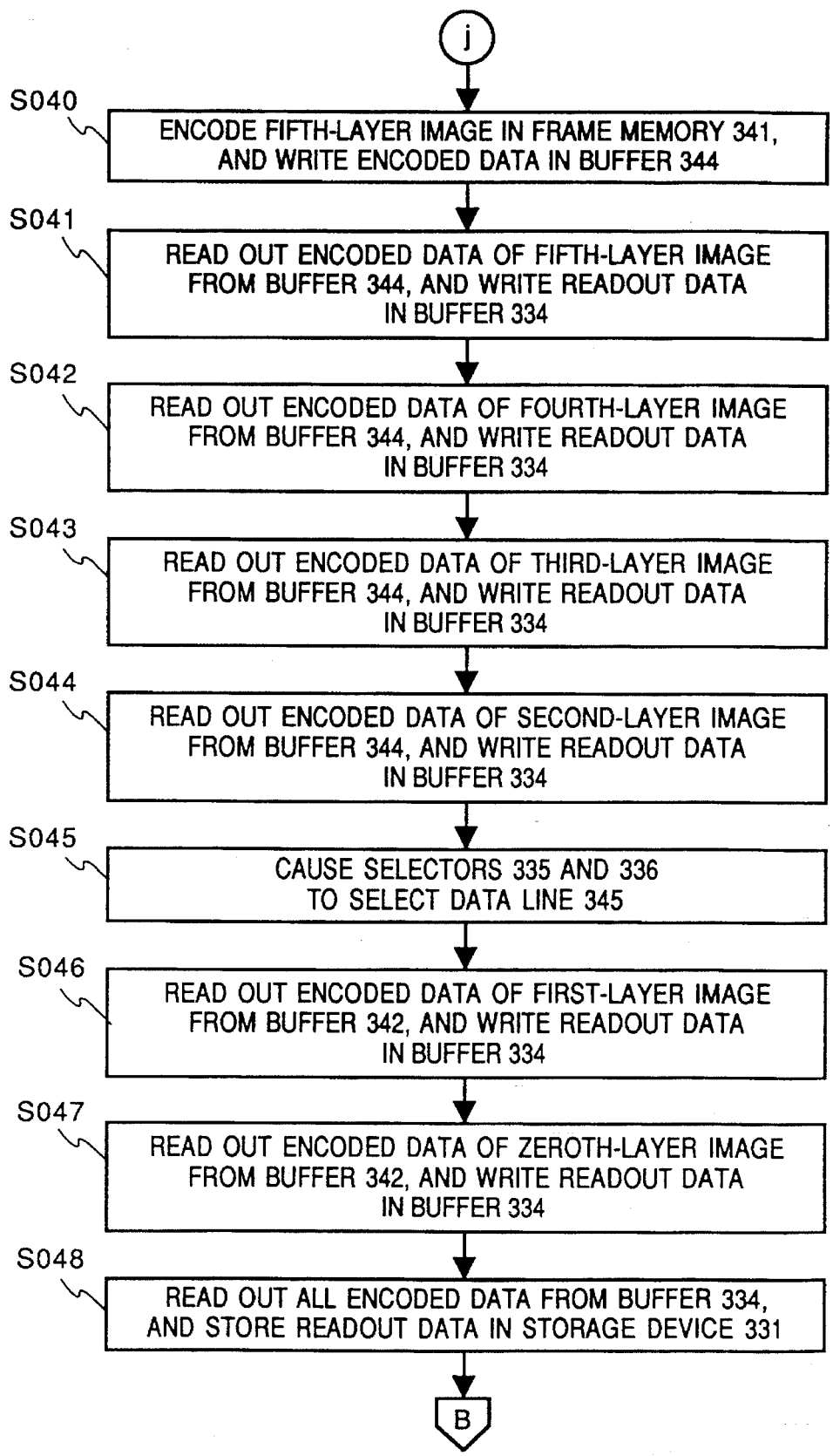
Figure 21D:
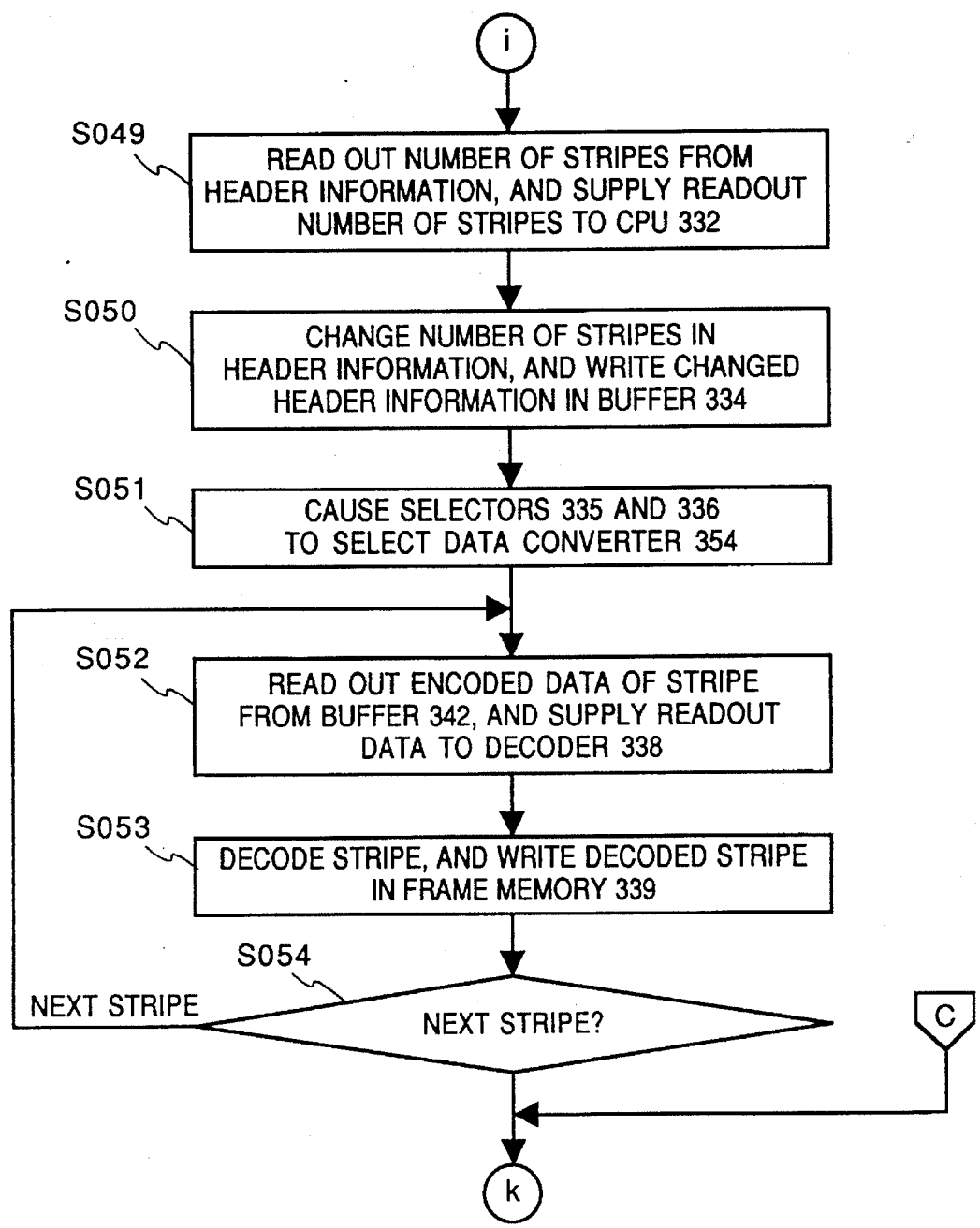
Figure 21E:
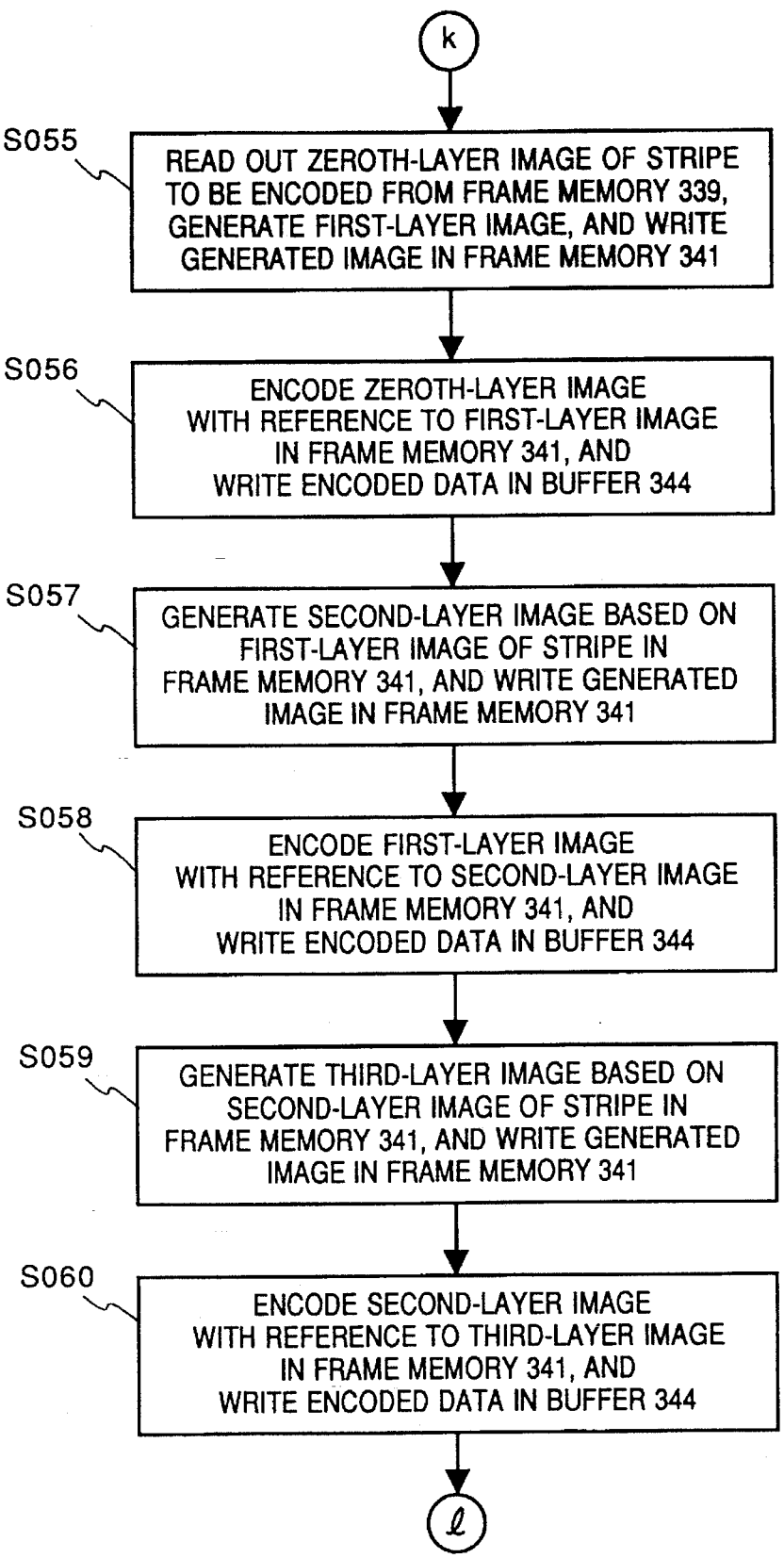
Figure 21G:
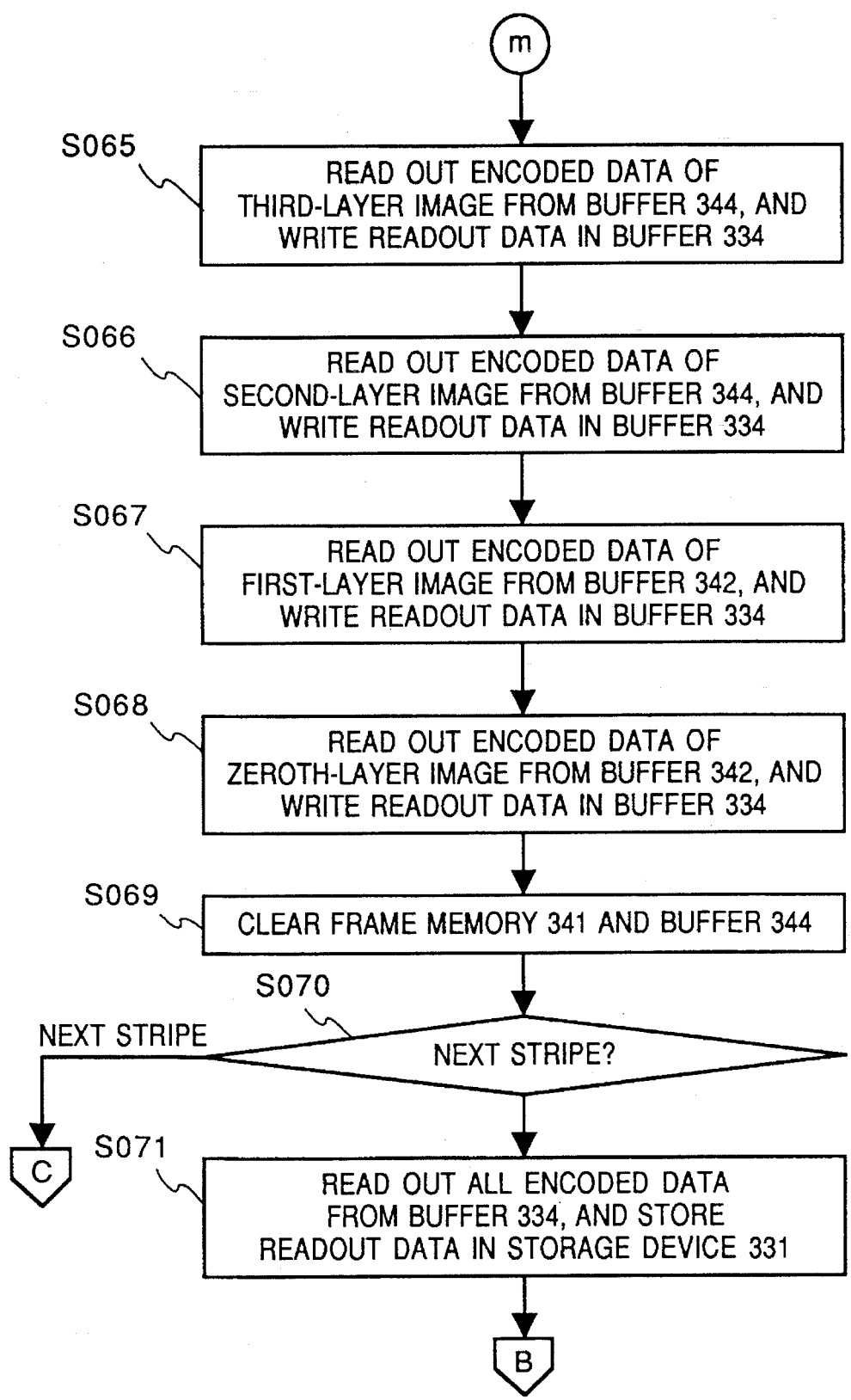

The communication interface 343 receives encoded data sent from the transmitting terminal, and informs the presence of incoming data to the CPU 332 (S011 in FIG. 20B). The CPU 332 reads encoded data of the next layer image from the interface 343, and stores the read data in the buffer 342 (S012). The CPU 332 writes the encoded data of the next layer image in the buffer 334 via the data line 345 (S013), and thereafter, sends the encoded data to the decoder 350 via the bus 333. The decoder 350 decodes the input encoded data with reference to a decoded image in the frame memory 351 (S014). The CPU 332 writes the decoded image in the frame memory 351 and the video frame memory 352, and causes the display 353 to display the decoded image (S008).

The above-mentioned processing is repeated until a layer which satisfies a user appears. Upon completion of the display of the layer which satisfies the user, the CPU 332 sends a message indicating the end of communication onto the communication line 314 via the bus 333 and the communication interface 343 (S024), and ends the communication.

The message indicating the end of communication is fetched via the communication interface 313, and is supplied to the CPU 302 (S107). Thus, the CPU 302 ends the transmission.

On the other hand, when the request from the CPU 332 indicates the sequential transmission, the CPU 302 instructs the selector 305 to select the data line 315 as its output, and the selector 306 to select the data line 315 as its input (S111 in FIG. 22A).

The CPU 302 reads out encoded data, in the sequential data format, of the requested image from the storage device 301, and sends the data in the order from the first stripe to the buffer 304 via the bus 303 (S112). The CPU 302 then stores the content of the buffer 304 in the buffer 312 via the data line 315 (S113). Thereafter, the CPU 302 sends the content of the buffer 312 onto the communication line 314 via the communication interface 313, thus ending the communication (S114).

At the receiving terminal, the communication interface 343 receives the encoded data via the communication line 314, and informs the presence of incoming data to the CPU 332 (S002). The CPU 332 stores header information and encoded data of layer images in the buffer 342 in the order from the first stripe (S003).

In this case, since the object of the communication is to perform the sequential transmission, the CPU 332 switches the output of the selector 336 to the data line 345, and switches the input of the selector 335 to the data line 345 (S015).

The CPU 332 writes the encoded data in the sequential data format in the buffer 334 via the data line 345 (S016). The CPU 332 sends the encoded data of the first stripe to the decoder 350 via the bus 333, and the decoder 350 decodes the input encoded data (S017). The CPU 332 writes the decoded image in the line buffer 355 (S018). Thereafter, the CPU 332 starts the printer 356, and causes the printer 356 to print the content of the line buffer 355 (S019).

Subsequently, the CPU 332 reads out the encoded data of the next stripe up to the zeroth layer from the buffer 334 via the bus 333, and sends the readout data to the decoder 350. The decoder 350 decodes the input encoded data (S021). The CPU 332 writes the stripe data of the decoded image in the line buffer 355 (S022), and the decoded image is output to the printer 356.

If it is determined in step S020 that decoding of encoded data of all the stripes is completed, the CPU 332 stops the printer 356 (S023), and ends the communication.

Figure 23A:
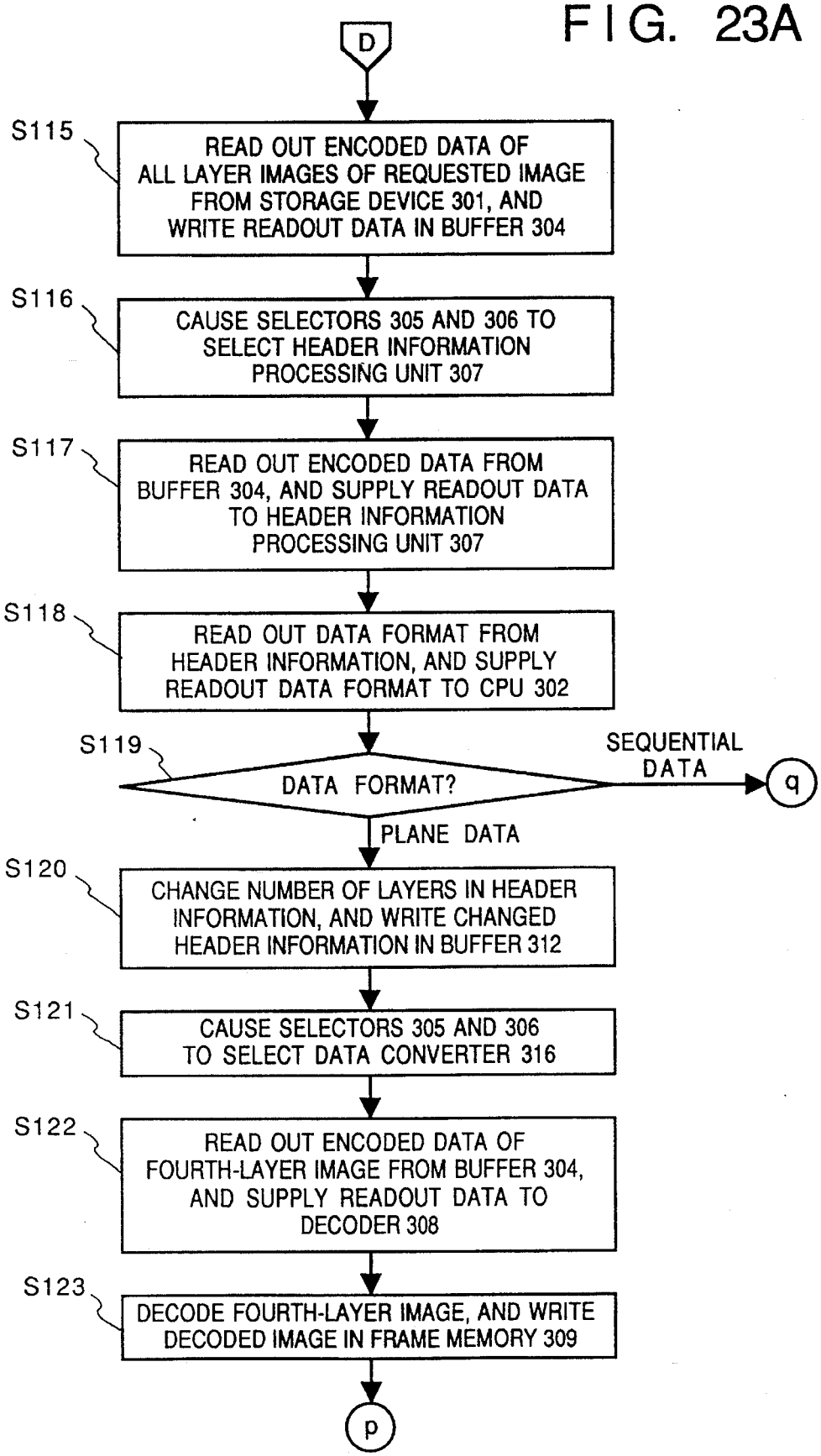
Figure 23B:
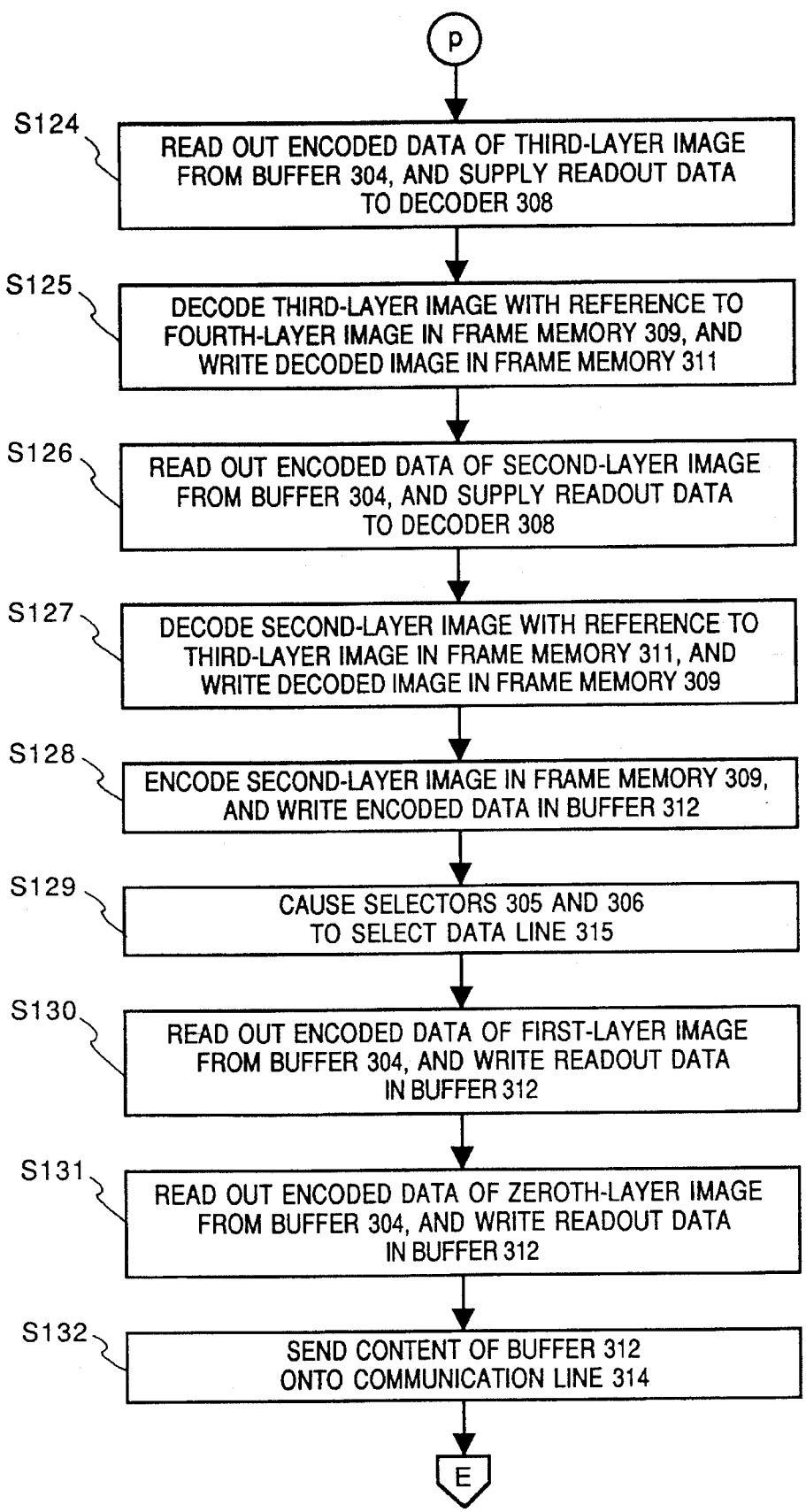
Figure 23C:
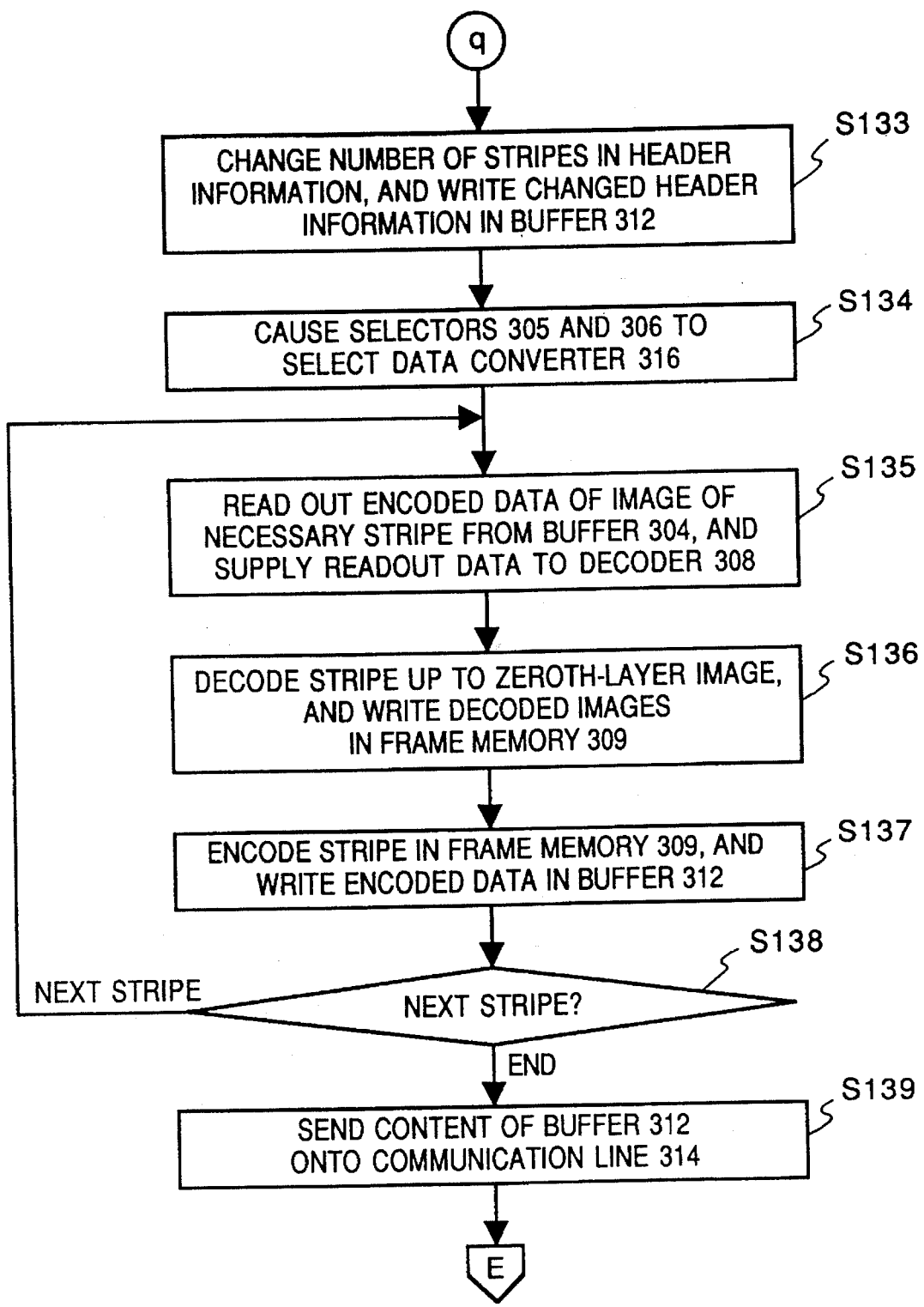

On the other hand, if the request from the CPU 332 indicates the all-layer data transfer operation, the CPU 302 reads out encoded data of all the layers of the requested image, and sends the readout data to the buffer 304 via the bus 303 (S115 in FIG. 23A).

The CPU 302 processes header information first. The CPU 302 instructs so that the output from the selector 305 is selected as the input to the header information processing unit 307, and the output from the header information processing unit 307 is selected as the input to the selector 306 (S116).

The CPU 302 fetches header information from the buffer 304, and sends it to the header information processing unit 307 via the selector 305 (S117). The header information processing unit 307 analyzes the header information, reads out the data format of the encoded data, and supplies the readout data format to the CPU 302 (S118).

The CPU 302 checks if the data format of encoded data to be transmitted is the plane data format or the sequential data format (S119).

First, a case will be described below wherein the data format of encoded data to be transmitted is the plane data format.

For the sake of simplicity, the number of layers of images in the plane data format stored in the storage device 301 is assumed to be 4. Similarly, the number of layers in a communication is set to be 2. The CPU 302 determines that the number of layers of encoded data to be transmitted is set to be 2, requests the header information processing unit 307 to change the header information, and the header information processing unit 307 changes the header information to have the number of layers=2. The changed header information is output to the buffer 312 via the selector 306 (S120).

Then, changing processing of encoded data of the fourth-to second-layer images in the plane data format is executed. The CPU 302 instructs to select the encoded data converter 316 as the output of the selector 305 and the input of the selector 306 (S121).

The CPU 302 reads out encoded data of the fourth-layer image from the buffer 304, and inputs the readout data to the decoder 308 via the selector 305 (S122). The decoder 308 decodes the input data, and stores the reproduced image in the frame memory 309 (S123). Subsequently, the CPU 302 reads out encoded data of the third-layer image from the buffer 304, and inputs the readout data to the decoder 308 via the selector 305 (S124). The decoder 308 decodes the encoded data of the third-layer image with reference to the fourth-layer image stored in the frame memory 309, and stores the reproduced image in the frame memory 311 (S125). Then, the CPU 302 reads out encoded data of the second-layer image from the buffer 304, and inputs the readout data to the decoder 308 via the selector 305 (S126). The decoder 308 decodes the encoded data of the second-layer image with reference to the third-layer image stored in the frame memory 311, and stores the reproduced image in the frame memory 309 (S127). The CPU 302 supplies the content of the frame memory 309 to the encoder 310 to perform encoding without referring to another layer image, and stores the encoded data after the header information in the buffer 312 via the selector 306 (S128).

Finally, the CPU 302 performs processing of encoded data of the first- and zeroth-layer images in the plane data format. The CPU 302 instructs to select the data line 315 as the output of the selector 305 and the input of the selector 306 (S129).

The CPU 302 reads out the encoded data of the first-layer image from the buffer 304, and stores the readout data after the encoded data of the second-layer image in the buffer 312 via the data line 315 (S130). Furthermore, the CPU 302 reads out the encoded data of the zeroth-layer image from the buffer 304, and stores the readout data after the encoded data of the first-layer image in the buffer 312 via the data line 315 (S131). Thereafter, the CPU 302 sends the content of the buffer 312 onto the communication line 314 via the communication interface 313 (S132), thus completing the transmission.

The CPU 332, which issued the request, receives the encoded data via the communication line 314 at the communication interface 343, and the communication interface 343 informs the presence of incoming data to the CPU 332 (S002 in FIG. 20A). The CPU 332 stores the encoded data of all the layer images in the buffer 342 (S003).

In this case, since the object of the communication is to perform the all-layer data transfer operation, the CPU 332 performs processing of header information first. The CPU 332 instructs so that the output from the selector 336 is selected as the input to the header information processing unit 337, and the output from the header information processing unit 337 is selected as the input to the selector 335 (S025 in FIG. 21A). The CPU 332 reads out header information from the buffer 342, and supplies the readout information to the header information processing unit 337 via the selector 336 (S026). The header information processing unit 337 analyzes the header information, reads out the data format of the encoded data, and supplies the readout data format to the CPU 332 (S027). In this case, since the data format is the plane data format, the CPU 332 causes the header information processing unit 337 to read out the number of layers (S029). In this case, the number of layers is 2. For the sake of simplicity, the number of layers of encoded data of images to be stored in the storage device 331 is assumed to be 5. The CPU 302 determines that the number of layers of encoded data to be stored is set to be 5, and requests the header information processing unit 337 to change the header information. The header information processing unit 337 changes the header information to have the number of layers=5, and outputs the changed header information to the buffer 334 via the selector 335 (S030).

Then, the CPU 332 performs processing of encoded data of the second-layer image in the buffer 342. The CPU 332 instructs so that the output from the selector 336 is selected as the input of the decoder 338 of the encoded data converter 354, and the output from the encoder 340 of the encoded data converter 354 is selected as the input to the selector 335 (S031).

The CPU 332 reads out encoded data of the second-layer image having the lowest resolution from the buffer 342, and supplies the readout data to the decoder 338 via the selector 336 (S032). The decoder 338 decodes the encoded data of the second-layer image, and stores the reproduced second-layer image in the frame memory 339 (S033).

Encoded data of the second- to fifth-layer images are generated based on the obtained second-layer image. The encoder 340 generates the third-layer image on the basis of the second-layer image in the frame memory 339, and stores the generated image in the frame memory 341 (S034). Subsequently, the encoder 340 encodes the second-layer image in the frame memory 339 with reference to the third-layer image stored in the frame memory 341, and stores the encoded data in the buffer 344 (S035).

Subsequently, the encoder 340 generates the fourth-layer image on the basis of the third-layer image in the frame memory 341, and stores the generated image in the frame memory 339 (S036). Thereafter, the encoder 340 encodes the third-layer image in the frame memory 341 with reference to the fourth-layer image stored in the frame memory 339, and stores the encoded data of the third-layer image after the encoded data of the second-layer image in the buffer 344 (S037).

Furthermore, the encoder 340 generates the fifth-layer image on the basis of the fourth-layer image in the frame memory 339, and stores the generated image in the frame memory 341 (S038). Thereafter, the encoder 340 encodes the fourth-layer image in the frame memory 339 with reference to the fifth-layer image stored in the frame memory 341, and stores the encoded data of the fourth-layer image after the encoded data of the third-layer image in the buffer 344 (S039).

The encoder 340 encodes the fifth-layer image in the frame memory 341, and stores the encoded data of the fifth-layer image in the buffer 344 after the encoded data of the fourth-layer image (S040).

The encoded data of the fifth-layer image is read out from the buffer 344, and is stored after the header information in the buffer 334 via the selector 335 (S041). The encoded data of the fourth-layer image is read out from the buffer 344, and is stored after the encoded data of the fifth-layer image in the buffer 334 via the selector 335 (S042). Furthermore, the encoded data of the third-layer image is read out from the buffer 344, and is stored after the encoded data of the fourth-layer image in the buffer 334 via the selector 335 (S043). Moreover, the encoded data of the second-layer image is read out from the buffer 344, and is stored after the encoded data of the third-layer image in the buffer 334 via the selector 335 (S044).

Finally, processing of encoded data of the first- and zeroth-layer images is performed. The CPU 332 instructs to select the data line 345 as the output of the selector 336 and the input of the selector 335 (S045). The CPU 332 reads out the encoded data of the first-layer image from the buffer 342, and stores the readout data after the encoded data of the second-layer image in the buffer 334 via the data line 345 (S046). Furthermore, the CPU 332 reads out the encoded data of the zeroth-layer image from the buffer 342, and stores the readout data after the encoded data of the first-layer image in the buffer 334 via the data line 345 (S047).

Thereafter, the CPU 332 reads out the content of the buffer 334, and stores the readout data in the storage device 331 as encoded data of all the layer images in the plane data format via the communication bus 333 (S048). Thus, the CPU 332 completes the communication, and manages the encoded data.

A case will be described below wherein the data format of encoded data to be transmitted is the sequential data format.

For the sake of simplicity, the number of stripes of images in the sequential data format stored in the storage device 301 is assumed to be 8, and the number of layers thereof is assumed to be 4. Similarly, the number of stripes in a communication is set to be 2. The CPU 302 determines that the number of stripes of encoded data to be transmitted is set to be 2, requests the header information processing unit 307 to change header information, and the header information processing unit 307 changes the header information to have the number of stripes=2. The changed header information is supplied to the buffer 312 via the selector 306 (S133 in FIG. 23C).

Then, conversion processing of encoded data in the sequential data format is performed. The CPU 302 instructs to select the encoded data converter 316 as the output of the selector 305 and the input of the selector 306 (S134).

The CPU 302 reads out encoded data of the first to fourth stripes of layer images from the buffer 304 first, and supplies the readout data to the decoder 308 via the selector 305 (S135). The decoder 308 decodes the input encoded data, and stores the zeroth-layer image in the frame memory 309 while storing reproduced images of intermediate layers in the frame memory 311 (S136).

The CPU 302 supplies the content of the frame memory 309 to the encoder 310 to perform encoding without data division into stripes, and stores encoded data in the buffer 312 after header information via the selector 306 (S137).

As the processing of the next stripe, the CPU 302 reads out encoded data of the fifth to eighth stripes of the images from the buffer 304, and supplies the readout data to the decoder 308 via the selector 305 (S135). The decoder 308 decodes the input encoded data, and stores the zeroth-layer image in the frame memory 309 while storing the reproduced images of the intermediate layers in the frame memory 311 (S137).

The CPU 302 inputs the content of the frame memory 309 to the encoder 310 to perform encoding without data division into stripes, and stores the encoded data after the encoded data of the first stripe in the buffer 312 via the selector 306 (S137).

If it is determined that conversion for all the stripes is completed, the CPU 302 sends the content of the buffer 312 onto the communication line 314 via the communication interface 313 (S139).

The communication interface 343 receives the encoded data via the communication line 314, and informs the presence of incoming data to the CPU 332 (S002). The CPU 332 stores encoded data of images in the sequential data format in the buffer 342 (S003).

As described above, since the object of the communication is to perform the all-layer data transfer operation, the CPU 332 performs processing of header information first. The CPU 332 instructs so that the output from the selector 336 is selected as the input to the header information processing unit 337, and the output from the header information processing unit 337 is selected as the input to the selector 335 (S025). The CPU 332 reads out the header information from the buffer 342, and supplies the readout information to the header information processing unit 337 via the selector 336 (S026). The header information processing unit 337 analyzes the header information, reads out the data format of the encoded data, and supplies the readout data format to the CPU 332 (S027). In this case, since the data format is the sequential data format, the CPU 332 causes the header information processing unit 337 to read out the number of stripes. The header information processing unit 337 analyzes the header information, reads out the data format of the encoded data, and supplies the readout data format to the CPU 332 (S049 in FIG. 21D). In this case, the number of stripes is 2. For the sake of simplicity, the number of stripes of images to be stored in the storage device 331 is assumed to be 4. The CPU 302 determines that the number of stripes of encoded data to be stored is set to be 4, and requests the header information processing unit 337 to change header information. The header information processing unit 337 changes the header information to have the number of stripes=4, and outputs the changed header information to the buffer 334 via the selector 335 (S050).

Then, processing of encoded data of the first stripe in the buffer 342 is performed. The CPU 332 instructs so that the output from the selector 336 is selected as the input to the decoder 338 of the encoded data converter 354, and the output from the encoder 340 of the encoded data converter 354 is selected as the input to the selector 335 (S051).

The CPU 332 reads out encoded data of the first stripe from the buffer 342, and supplies the readout data to the decoder 338 via the selector 336 (S052). The decoder 338 decodes the input encoded data, and stores the reproduced image of the first stripe in the frame memory 339 (S053).

Subsequently, the CPU 332 reads out encoded data of the second stripe from the buffer 342 first, and supplies the readout data to the decoder 338 via the selector 336 (S052). The decoder 338 decodes the input encoded data, and stores the reproduced image of the second stripe after the reproduced image of the first stripe in the frame memory 339 (S053).

After the zeroth-layer image portions of all the stripes are obtained, encoded data divided into four stripes are generated on the basis of the zeroth-layer image in the frame memory 339. The encoder 340 reads out data of the first stripe from the zeroth-layer image in the frame memory 339, reduces the readout data to generate a first-layer image, and stores the generated image in the frame memory 341 (S055 in FIG. 21E). Subsequently, the encoder 340 encodes the zeroth-layer image of the stripe to be encoded in the frame memory 339 with reference to the first-layer image of the stripe stored in the frame memory 341, and stores the encoded data in the buffer 344 (S056).

The encoder 340 reads out the first-layer image of the stripe stored in the frame memory 341, reduces the readout image to generate a second-layer image, and stores the generated image in the empty area of the frame memory 341 (S057). The encoder 340 encodes the first-layer image in the frame memory 341 with reference to the second-layer image of the stripe stored in the frame memory 341, and stores the encoded data after the encoded data of the zeroth-layer image in the buffer 344 (S058).

The encoder 340 reads out the second-layer image of the stripe stored in the frame memory 341, reduces the readout image to generate a third-layer image, and stores the generated image in the empty area of the frame memory 341 (S059). The encoder 340 encodes the second-layer image in the frame memory 341 with reference to the third-layer image of the stripe stored in the frame memory 341, and stores the encoded data after the encoded data of the first layer image in the buffer 344 (S060).

Also, the encoder 340 reads out the third-layer image of the stripe stored in the frame memory 341, reduces the readout image to generate a fourth-layer image, and stores the generated image in the empty area of the frame memory 341 (S061 in FIG. 21F). The encoder 340 encodes the third-layer image in the frame memory 341 with reference to the fourth-layer image of the stripe stored in the frame memory 341, and stores the encoded data after the encoded data of the second-layer image in the buffer 344 (S062).

Furthermore, the encoder 340 encodes the fourth-layer image of the stripe stored in the frame memory 341, and stores the encoded data after the encoded data of the third-layer image in the buffer 344 (S063).

The CPU 332 reads out the encoded data of the fourth-layer image of the stripe from the buffer 344, and stores the readout encoded data after the header information in the buffer 334 via the selector 335 (S064). The CPU 332 reads out the encoded data of the third-layer image of the stripe from the buffer 334, and stores the readout encoded data after the encoded data of the fourth-layer image in the buffer 334 via the selector 335 (S065 in FIG. 21G). Furthermore, the CPU 332 reads out the encoded data of the second-layer image of the stripe from the buffer 344, and stores the readout encoded data after the encoded data of the third-layer image in the buffer 334 via the selector 335 (S066). Moreover, the CPU 332 reads out the encoded data of the first-layer image of the stripe from the buffer 344, and stores the readout encoded data after the encoded data of the second-layer image in the buffer 334 via the selector 335 (S067). Also, the CPU 332 reads out the encoded data of the zeroth-layer image of the stripe from the buffer 344, and stores the readout encoded data after the encoded data of the first-layer image in the buffer 334 via the selector 335 (S068). After these data are stored, the CPU 332 clears the frame memory 341 and the buffer 344 (S069), and performs encoding of the next stripe.

Thereafter, the CPU 332 similarly repeats the above-mentioned processing up to the eighth stripe. Upon completion of the processing, the CPU 332 stores the content of the buffer 334 in the storage device 331 as encoded data of all the layer images in the sequential data format (S071). Thus, the CPU 332 completes the communication, and manages the encoded data.

[Fourth Embodiment]

In the above embodiment, a binary image is processed for the sake of simplicity. However, the present invention can be easily applied to encoding of various other kinds of images such as a multi-value image, a color image, a dynamic image, and the like as long as encoding utilizing layer images is adopted.

The numbers of layers and stripes are not limited to those in the above embodiment. For example, the number of layers in a communication may be zero.

More specifically, when an image is stored in a storage device, it is subjected to hierarchical encoding, and when an image is transmitted, it is subjected to non-hierarchical encoding. The received non-hierarchically encoded data is converted into hierarchically encoded data, and is stored in a storage device, or the converted data is directly decoded to perform a hierarchical display operation.

Figure 24:
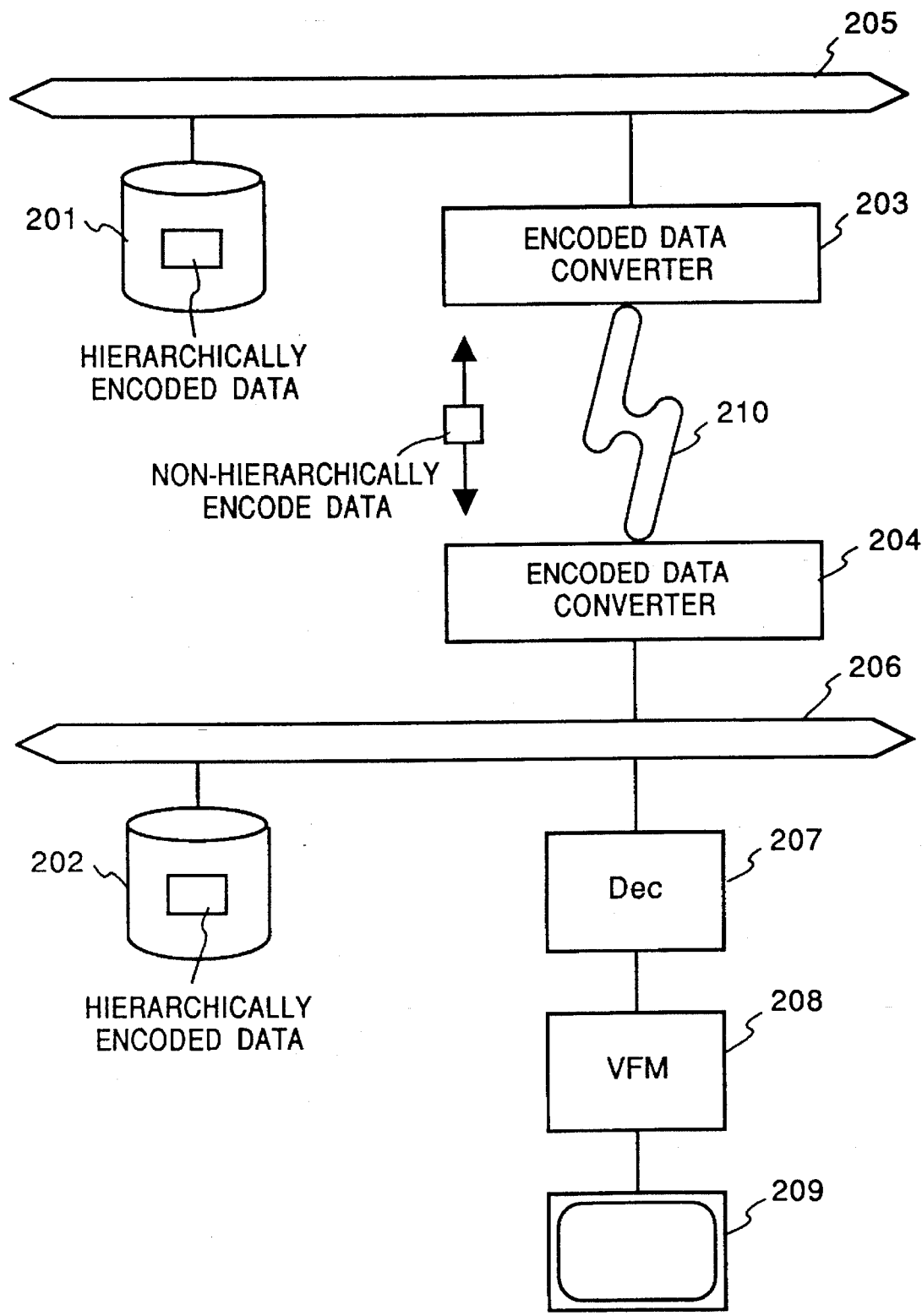
FIG. 24 is a block diagram showing an arrangement of an image communication apparatus according to the fourth embodiment of the present invention.

FIG. 24 shows an image communication apparatus according to the fourth embodiment of the present invention. For the sake of simplicity, a binary image is used as an image to be processed. Reference numerals 201 and 202 denote storage devices for storing layer images encoded by the JBIG algorithm. Reference numerals 205 and 206 denote buses for exchanging hierarchically encoded data. Reference numeral 210 denotes a communication line for connecting communication apparatuses. Reference numerals 203 and 204 denote encoded data converters for converting hierarchically encoded data input from the corresponding buses 205 and 206 into non-hierarchically encoded data, and sending the converted data onto the communication line 210, and for converting the non-hierarchically encoded data input from the communication line 210 into hierarchically encoded data, and sending the converted data onto the corresponding buses. For the sake of simplicity, in encoding of a non-hierarchial image, the number of layers is set to be zero in the JBIG algorithm, and only the zeroth-layer image is encoded without referring to another layer image. Reference numeral 207 denotes a decoder for decoding input hierarchically encoded data, and outputting a decoded image in an enlarged scale. Reference numeral 208 denotes a video frame memory for storing the decoded image in the enlarged scale. Reference numeral 209 denotes a display for displaying the content of the video frame memory 208.

Encoded data stored in the storage device 201 is supplied to the encoded data converter 203 via the bus 205. For the sake of simplicity, the number of layers of hierarchically encoded data in the storage devices 201 and 202 is assumed to be 4, and the number of stripes thereof is assumed to be 8. The encoded data converter 203 temporarily decodes the input hierarchically encoded data in units of stripes to obtain a zeroth-layer image, then encodes the zeroth-layer image, and sends the encoded data of the zeroth-layer image onto the communication line 210. Upon completion of conversion processing for all the stripes, the transmission operation is ended. The encoded data converter 204 decodes the encoded data of the zeroth-layer image sent through the communication line 210, hierarchically encodes the data according to the JBIG algorithm, and stores the encoded data in the storage device 202 via the bus 206 or supplies it to the decoder 207 via the bus 206. The decoder 207 receives encoded data from the encoded data converter 204 or the storage device 202 via the bus 206, decodes images in the order from the fourth-layer image, enlarges the decoded image in correspondence with the layer, and writes the decoded image in the video frame memory 208, thus displaying the decoded image on the display 209.

In this manner, since only the zeroth-layer image is encoded, an increase in encoding amount caused upon execution of hierarchical encoding can be prevented, and data transmission efficiency can be improved.

As the non-hierarchical encoding, encoding of only the zeroth-layer image of the JBIG algorithm has been exemplified. However, a sequential encoding method such as MH, MR, MMR, or the like may be adopted.

Furthermore, the concept of hierarchy is not limited to reduced image generation, but may be defined by an information amount like in a JPEG algorithm. Furthermore, any other definitions may be adopted.

Upon encoding, either of a method of encoding data with reference to a stripe (SU-1) immediately before a stripe (SU) to be encoded or a method of encoding a stripe (SU) alone without referring to the immediately preceding stripe may be selected.

In the description of the above embodiment, conversion of the number of layers and conversion of the number of stripes are separately executed, but may be simultaneously executed.

The present invention is not limited to the arrangements of the apparatuses and their operation procedures described above.

Encoding-decoding processing of header information may be performed in a software manner of a CPU.

The order of generation of encoded data is not limited to that described above, and encoded data may be generated in the order from a lower layer (zeroth layer).

As described above, in an all-layer data communication mode, since data is transmitted while the numbers of layers and stripes of hierarchical encoding are converted, communication cost can be reduced. Since an encoder and a decoder include many common components, even when the number of encoders is increased, an increase in the number of hardware components is very small, and an increase in cost of the apparatus can be minimized. In particular, the above-mentioned processing is effective for a case wherein data is transferred from, e.g., a center machine of a database to a plurality of terminal machines connected thereto.

Furthermore, when the number of layers is adjusted in a receiving terminal, discrimination of, e.g., the sizes of images in data management or quick searching for displaying a plurality of low-resolution images is facilitated.

When the size of stripe is adjusted in a receiving terminal, the size of data to be managed can be controlled, thus allowing easy data management. In addition, data can be converted to have a size matching with that of a display or a printer in the receiving terminal, thus allowing easily output control.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   inputting means for inputting first code data obtained by encoding an image with an encoding method other than a hierarchical encoding method;
   converting means for converting the first code data into second code data by encoding an image represented by the first code data with the hierarchical encoding method, the second code data representing image data of the image;
   storing means for storing the second code data output from said converting means, said storing means storing the second code data representing a plurality of images;
   decoding means for decoding the second code data read out from said storing means and generating image data; and
   display means for displaying a plurality of images, each having a low resolution, in accordance with the image data having a low resolution, generated by said decoding means.

2. The apparatus according to claim 1, wherein said converting means decodes the first code data to generate image data and encodes the generated image data with the hierarchical encoding method.

3. The apparatus according to claim 1, wherein said decoding means decodes the second code data so that a resolution of the image displayed by said display means is sequentially increased.

4. The apparatus according to claim 1, further comprising searching means for searching a desired image, wherein said decoding means decodes the second code data corresponding to the desired image and generates image data having a high resolution.

5. The apparatus according to claim 1, wherein said inputting means receives the first code data through a communication line.

6. The apparatus according to claim 1, wherein said converting means comprises:
   second decoding means for decoding the first code data and generating image data line by line;
   memory means comprising a plurality of storage sections, for storing a plurality of lines of image data generated by said second decoding means in each of the plurality of storage sections; and
   encoding means for encoding a plurality of lines of image data stored in each of the plurality of storage sections with the hierarchical encoding method and generating the second code data.

7. The apparatus according to claim 6, wherein said encoding means encodes a plurality of lines of image data stored in one of the storage sections while another plurality of lines of image data is being stored in another one of the storage sections.

8. The apparatus according to claim 1, wherein said inputting means inputs MH-encoded data as the first code data.

9. An image processing method comprising the steps of:
   inputting first code data obtained by encoding an image with an encoding method other than hierarchical encoding method;
   converting the first code data into second code data by encoding an image represented by the first code data with the hierarchical encoding method, the second code data representing image data of the image;
   storing the second code data representing a plurality of images;
   decoding the second code data and generating image data; and
   displaying a plurality of images, each having a low resolution, in accordance with the generated image data having a low resolution.

10. The method according to claim 5, wherein said converting step further comprises the steps of:
    decoding the first code data and generating image data;
    dividing the image data into a plurality of parts of image data;
    storing the plurality of parts of image data; and
    encoding the plurality of parts of image data with the hierarchical encoding method, respectively.

11. The method according to claim 10, wherein, in the dividing step, each of the plurality of parts of image data includes a plurality of lines of image data.

12. The method according to claim 10, wherein the encoding of image data in the encoding step is performed in parallel with the decoding of the first code data in the decoding step.

13. The method according to claim 9, wherein, in the converting step, the first code data is decoded to generate image data and the generated image data is encoded with the hierarchical encoding method.

14. The method according to claim 9, wherein, in the decoding step, the second code data is decoded so that a resolution of the image to be displayed is sequentially increased.

15. The method according to claim 9, wherein, in the inputting step, the first code data is received through a communication line.

16. The method according to claim 9, wherein, in the inputting step, MH-encoded data is input as the first code data.

17. An image processing apparatus comprising:
    input means for inputting first code data obtained by encoding an image with an encoding method other than a hierarchical encoding method;
    first decoding means for decoding the first code data and generating image data;

encoding means for encoding the image data with the hierarchical encoding method and generating second code data, the second code data representing image data of the image;

storing means for storing the second code data generated by said encoding means, said storing means storing the second code data representing a plurality of images and; and second decoding means for decoding the second code data stored in said storing means corresponding to a desired image among the plurality of images and generating image data.

18. The apparatus according to claim 17, wherein said input means receives the first code data through a communication line.

19. The apparatus according to claim 17, wherein said input means inputs MH-encoded data s the first code data.

20. The apparatus according to claim 17, further comprising memory means for storing the image data generated by said first decoding means.

21. The apparatus according to claim 17, further comprising display means for displaying an image in accordance with image data generated by said second decoding means.

22. An image processing method comprising:

a first step of inputting first code data obtained by encoding an image with an encoding method other than a hierarchical encoding method;

a second step of decoding the first code data and generating image data;

a third step of encoding the image data with the hierarchical encoding method and generating second code data, the second code data representing image data of the image;

a fourth step of storing the second code data representing a plurality of images; and a fifth step of decoding the stored second code data corresponding to a desired image among the plurality of images.

23. The method according to claim 22, wherein the encoding of the image data in the third step is performed in parallel with the decoding of the first code data in the second step.

24. The method according to claim 22, wherein, in the first step, the first code data is received through a communication line.

25. The method according to claim 22, wherein, in the first step, MH-encoded data is input as the first code data.

26. The method according to claim 22, further comprising a sixth step of displaying an image in accordance with the decoded second code data.

27. The method according to claim 22, further comprising a seventh step of printing the desired image in accordance with the decoded second code data.

28. The apparatus according to claim 1, further comprising printing means for printing an image having a high resolution in accordance with image data having a high resolution generated by said decoding means.

29. The method according to claim 9, further comprising a step of printing an image having a high resolution in accordance with image data having a high resolution generated at the decoding step.

30. The apparatus according to claim 17, further comprising printing means for printing the desired image in accordance with the image data generated by said second decoding means.

* * * * *

UNITED STATES PATENT AND TRADEMARK OFFICE
CERTIFICATE OF CORRECTION

PATENT NO. : 5,521,717
DATED : May 28, 1996
INVENTOR(S) : MITSURU MAEDA

It is certified that error appears in the above-identified patent and that said Letters Patent is hereby corrected as shown below:

ON COVER PAGE

AT [54] TITLE,
"IMAGE PROCESSING APPARATUS AND METHOD THEREFOR" should read --CONVERSION OF DATA ENCODED OTHER THAN WITH A HIERARCHICAL METHOD, TO HIERARCHIACALLY ENCODED DATA--.

AT [56] REFERENCES CITED,
U.S. Patent Documents,
"4,939,583  7/1990 Tsubori et al." should read
--4,939,583  7/1990 Tsuboi et al.--.

AT [57] ABSTRACT,
Line 6, "grounds" (both occurences) should read
--groups--.

IN THE DRAWINGS

SHEET 20 OF 37,
FIG. 19A, "DECOER" should read --DECODER--.

SHEET 21 OF 37,
FIG. 19B, "DECOER" should read --DECODER--.

COLUMN 1

Lines 1-2, "IMAGE PROCESSING APPARATUS AND METHOD THEREFOR" should read
--CONVERSION OF DATA ENCODED OTHER THAN WITH A HIERARCHICAL METHOD, TO HIERARCHIACALLY ENCODED DATA--.

UNITED STATES PATENT AND TRADEMARK OFFICE
CERTIFICATE OF CORRECTION

PATENT NO. : 5,521,717
DATED : May 28, 1996
INVENTOR(S) : MITSURU MAEDA

It is certified that error appears in the above-identified patent and that said Letters Patent is hereby corrected as shown below:

COLUMN 2

Line 29, "a merit" should read --the advantage--.

COLUMN 5

Line 26, "display" (second occurrence) should read --displaying--.

COLUMN 24

Line 31, "claim 5," should read --claim 9,--.

COLUMN 25

Line 7, "images" should read --images; and--.
Line 8, "and; and" should be deleted.
Line 17, "s" should read --as--.

Signed and Sealed this

Fifteenth Day of October, 1996

BRUCE LEHMAN

Attest:

Attesting Officer

Commissioner of Patents and Trademarks